United States Patent
Yamamoto et al.

[11] Patent Number: 6,049,674
[45] Date of Patent: Apr. 11, 2000

[54] SELF-PHOTOGRAPHY APPARATUS FOR MAKING IDENTIFICATION PHOTOGRAPH

[75] Inventors: Shohei Yamamoto; Osamu Fukushima, both of Tokyo; Masataka Murata; Toshiaki Aono, both of Kanagawa; Nobuyuki Iwasaki, Tokyo, all of Japan

[73] Assignee: Fuji Photo Film Co., Ltd., Kanagawa, Japan

[21] Appl. No.: 08/314,788

[22] Filed: Sep. 29, 1994

Related U.S. Application Data

[63] Continuation of application No. 08/111,515, Aug. 24, 1993, abandoned.

[30] Foreign Application Priority Data

Aug. 24, 1992 [JP] Japan .................................. 4-224403
Aug. 24, 1992 [JP] Japan .................................. 4-224405

[51] Int. Cl.[7] .................................................. G03B 15/00
[52] U.S. Cl. ........................................................ 396/2
[58] Field of Search ............................. 354/290, 195.1, 354/410, 432; 396/1, 2, 429; 348/77

[56] References Cited

U.S. PATENT DOCUMENTS 4,903,057  2/1990  Yamamoto et al. ............... 354/290 X
4,959,670  9/1990  Thayer, Jr. ........................ 354/290 X
5,122,825  6/1992  Tokumoiru ........................... 354/400
5,266,985  11/1993  Takagi ................................. 354/410

Primary Examiner—Howard B. Blankenship
Attorney, Agent, or Firm—Sughrue, Mion, Zinn, Macpeak & Seas, PLLC

[57] ABSTRACT

A self-photography apparatus has an imaging device for picking up an image signal representing a facial image of a human object, a determination device for determining the size of face of the human object. In accordance with the determined face size, the magnification of the image is adjusted so as to make the facial image have a predetermined size in a photograph. The determination device is comprised of a monitor display displaying a video facial image of the human object and indices as the scale of the face size. The magnification of image is changed by manually or automatically changing the object distance or mechanically changing the focal length of a taking lens device. When making a photograph by video printing, the determination device may be a controller determining the face size on the basis of the image signal, an image magnification conversion circuit converts the magnification of image in accordance with the face size determined by the controller. Based on the magnification-converted image signal, a video printer records the facial image on a photosensitive material.

30 Claims, 17 Drawing Sheets

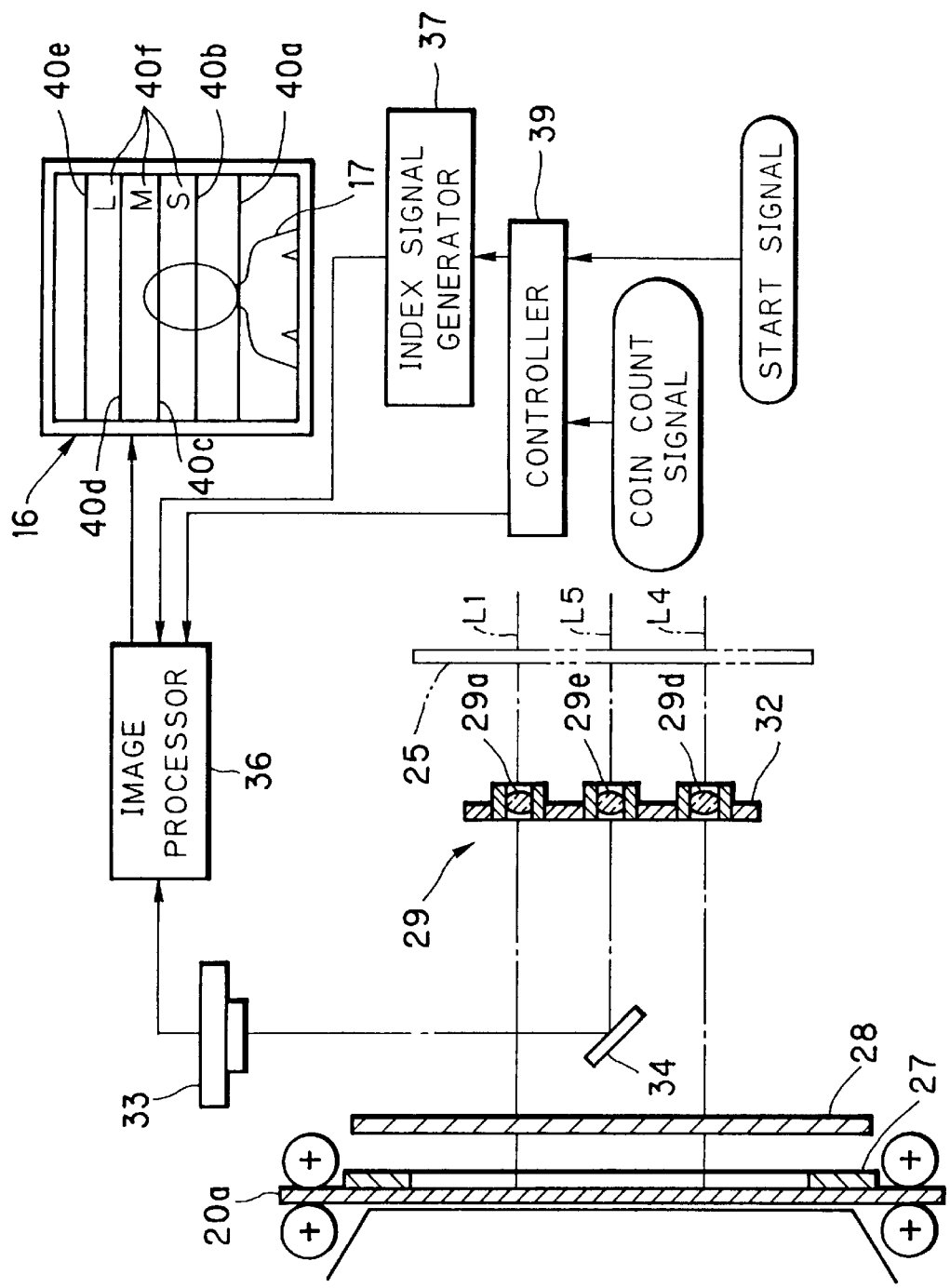

F I G. 15
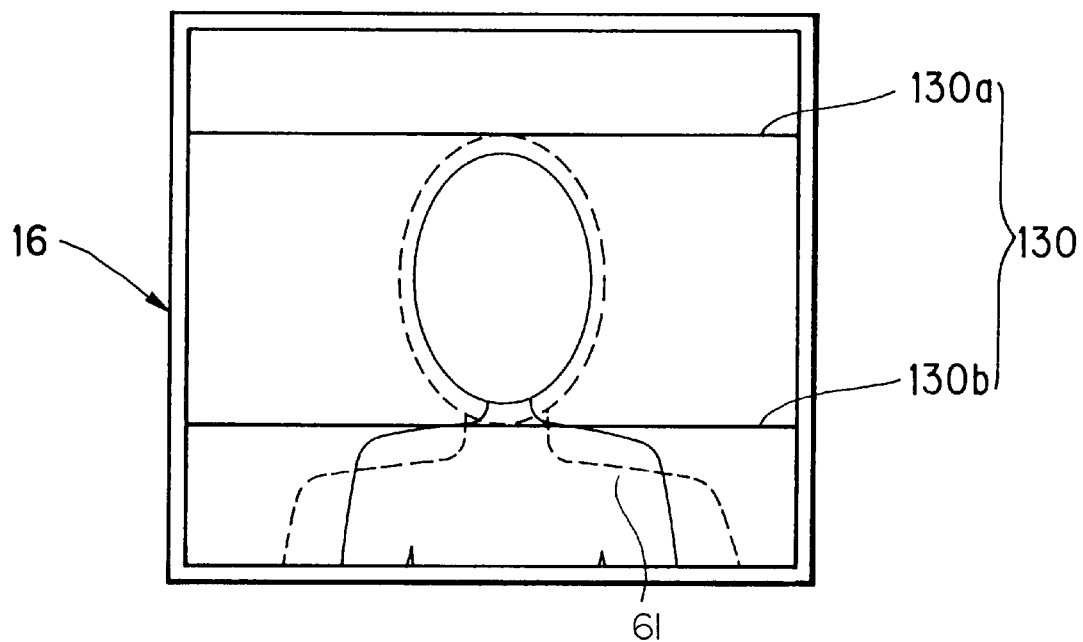

SELF-PHOTOGRAPHY APPARATUS FOR MAKING IDENTIFICATION PHOTOGRAPH

This is a Continuation of Application No. 08/111,515 filed Aug. 24, 1993, now abandoned.

BACKGROUND OF THE INVENTION

1. Field of the Invention

The present invention relates to a self-photography apparatus for making portraits for identification documents, such as a passport or a license. In particular, the present invention is a self-photography apparatus which can make photographic portraits including a facial image of a standardized size.

2. Description of the Related Art

Recently, a mechanically readable passport (MRP) has been introduced. Such a device requires that the standard of identification photographs, or portraits, necessary for the application for a passport be changed. According to the new standard, the identification photograph should have a frame size of 44 mm×35 mm in length A and width B, respectively, as illustrated in FIG. 1. The size of a facial image within the frame, that is, the length C from the crown of the head to the chin, should be 27±2 mm. The length D from the left margin of the frame to the center of the facial image should be 17±2 mm, and the length E from the top margin of the frame to the crown of the head of the facial image should be 7±2 mm.

A conventional self-photography apparatus for making identification portraits, such as disclosed in JPA 1-193824, is sectioned into an exposure room and a photographic processing room. A person who requires the portrait sits on a chair to bring his or her eyes reflected in an exposure window in accordance with a position indicated by eye marks. Thereafter, a given amount of currency or coins are inserted into the apparatus and a start button is actuated. Then, a photography system accommodated in the photographic processing room is activated to automatically perform photographing and photofinishing.

As a result, for example, a photographic print including four identical facial images is produced if a lens cluster consisting of four lenses arranged in a 2×2 matrix is used in a known manner.

Because the conventional self-photography apparatus is not designed to make photographs in accordance with the new standard, it is possible that the size of facial image does not fit with the new standard if the actual size of the subject's face is too large or too small.

SUMMARY OF THE INVENTION

In view of the foregoing, a primary object of the present invention is to provide a self-photography apparatus which can make photographs including facial images each having the standardized size notwithstanding the variation of the actual face size of the subject.

To achieve the above and other objects, the present invention provides an imaging device for picking up an image signal representing a facial image of a human subject, a detection device for detecting the size of the subject's face, and a setting device for setting a magnification of the image in accordance with the detected face size, to cause the facial image to have a predetermined size on a resulting photograph.

According to a preferred embodiment, the detection device has a monitor display connected to the imaging device which displays a video facial image of the subject thereon based on an image signal and indices provided in relation to the video facial image. In this embodiment, the setting device includes indices or marks indicating an appropriate object distance for a plurality of predetermined standards. The setting device also includes a device for adjusting object distance in accordance with the face size determined with reference to the monitor display. The object distance adjusting device may be manually or mechanically operated. The setting device can adjust the focal length of a taking lens system in accordance with the determined face size, for example.

When making a portrait through a video printing device, the detection device may include a controller for detecting the subject's face size, on the basis of the image signal picked up by the imaging device, with reference to a standard face size stored in a memory. In this embodiment, the setting device is an image magnification conversion circuit which converts the magnification of image in accordance with the face size detected by the controller. A video printer then records the facial image on a photosensitive material based on the image signal.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein:

FIG. 1 illustrates the standard for identification photographs for passports or the like;

FIG. 6 is an explanatory view showing essential parts of the self-photography apparatus shown in FIG. 3;

FIG. 15 is an explanatory view illustrating another embodiment of indices displayed on a CRT display;

DETAILED DESCRIPTION OF THE PREFERRED EMBODIMENTS

In order to match the size of the facial image of a portrait with the standard for a passport, or the like, it is possible to change the magnification of the image relative to the photographic frame according to the actual size of the subject's face.

As a result of investigations relating to the adjustment of the image magnification, it was found that if a photographic object is disposed within a range from about 10 cm forward of an optimum position, that corresponds to the focus point of a conventional lens cluster, to about 15 cm rearward of the optimum position, an image of the object made through the lens cluster falls within the depth of focus of the lens cluster, assuming that the lens cluster has a focal length F=117 mm and a magnification of factor 0.11. It was also found that a standing photograph having a focused facial image can be obtained from an actual subject's face having a size from about 21 cm to 29 cm by changing the object distance without departing from the above-mentioned acceptable focus range.

For changing the object distance to obtain such a standard photograph, it is first of all necessary to determine the actual size of the subject's face to be photographed.

Figure 3:
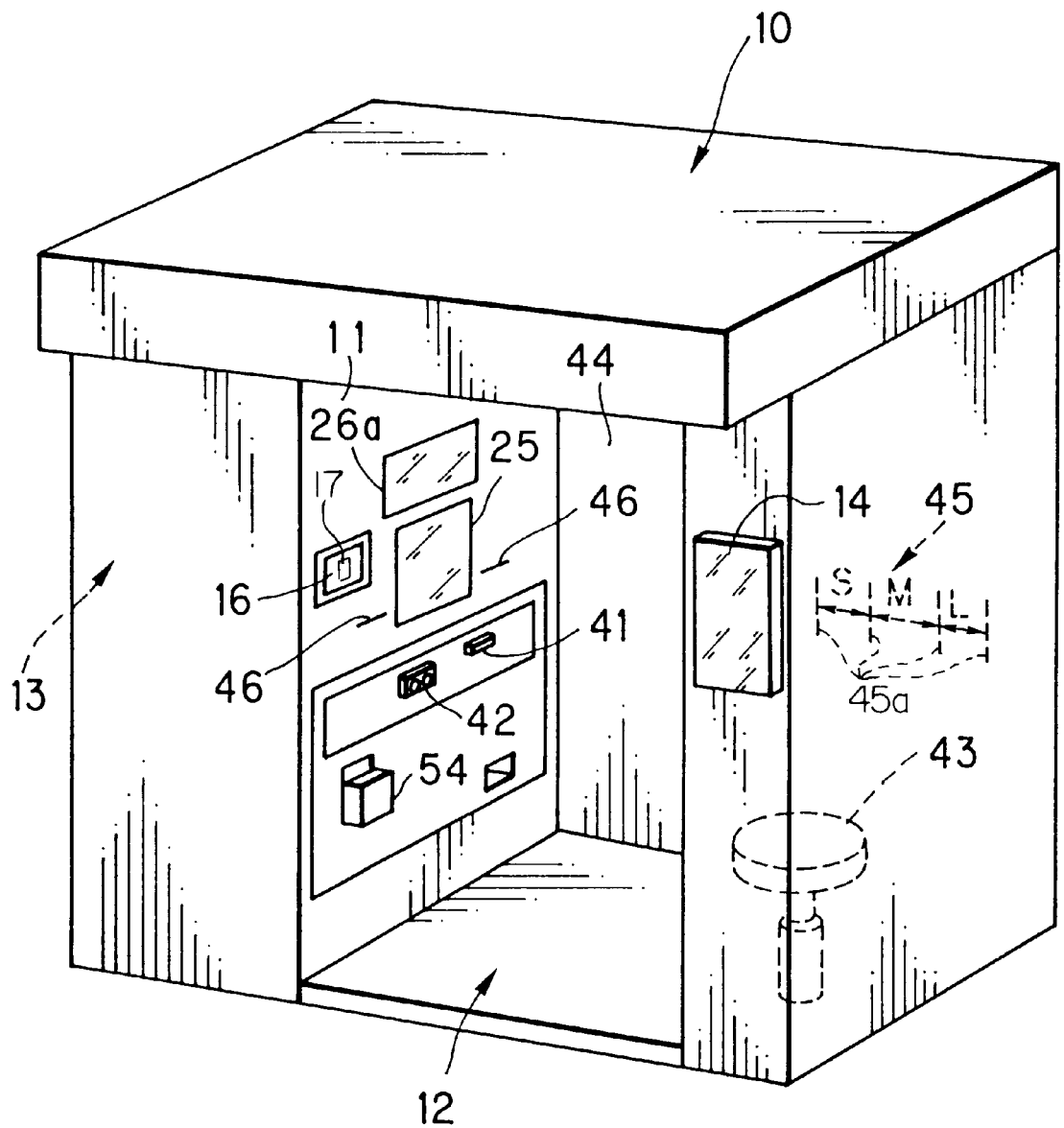
FIG. 3 is a perspective view of a self-photography apparatus according to an embodiment of the present invention.

FIG. 3 illustrates a self-photography apparatus which has a monitor system for determining the actual size of a face to be photographed. The photographic apparatus 10 is sectioned by a separating wall 11 into an exposure room 12 and a photo-processing room 13. A mirror 14 for self-grooming is attached to an outer wall of the apparatus 10 on one side of an entrance to an the exposure room 12. A cathode ray tube (CRT) display 16 of the monitor system is mounted to the separating wall to display a video image 17 of the subject's face for determining the size of the subject's face.

Figure 4:
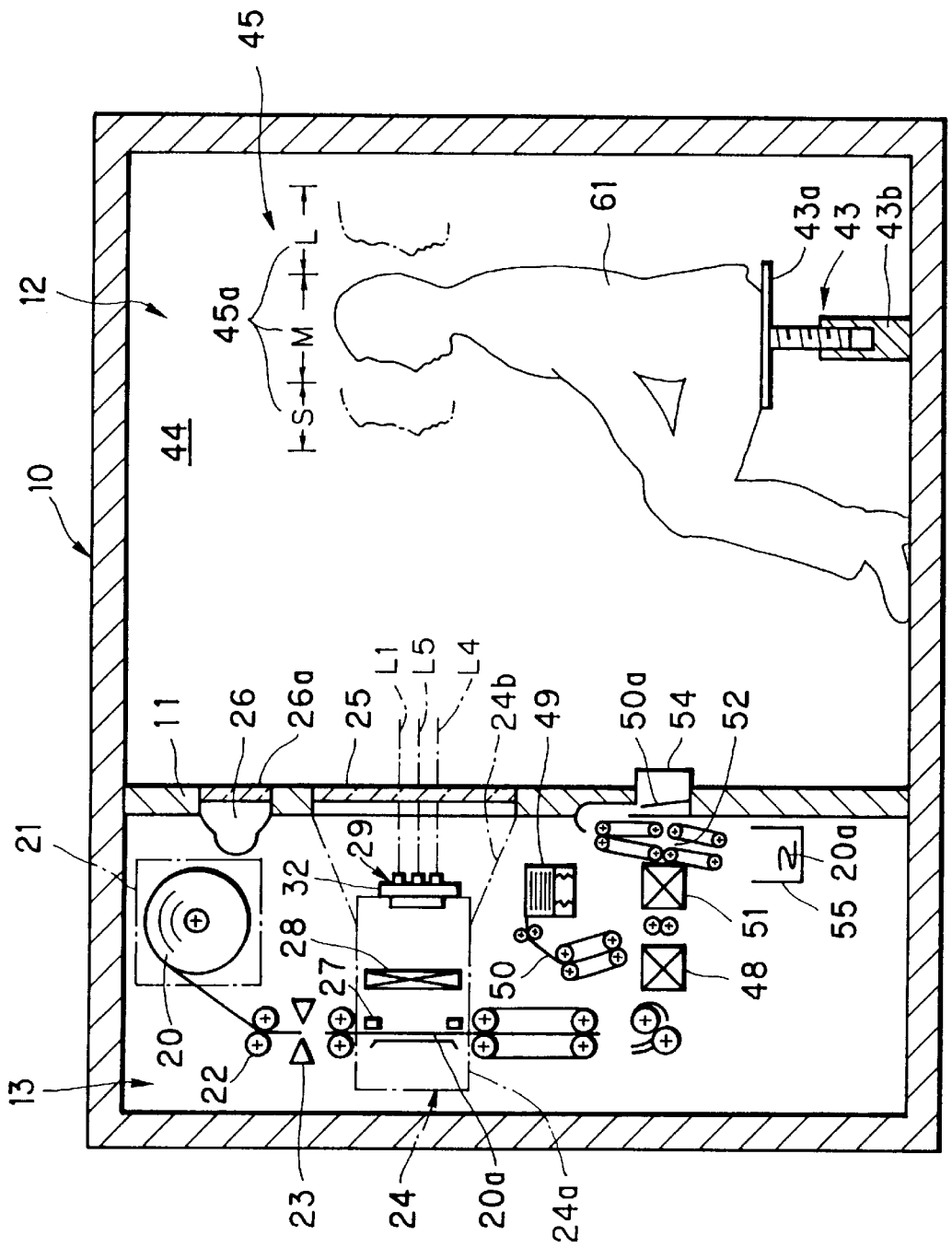
FIG. 4 is an explanatory view of the overall construction of the self-photography apparatus shown in FIG. 3, in partial section.

As shown in FIG. 4, the photo-processing room 13 is loaded with a magazine 21 containing a roll of photosensitive material 20 of a heat development type. A pair of feed rollers 22 draw out the photosensitive material 20 from the magazine 21 by a given amount for each exposure, and a cutter 23 cuts the photosensitive material 20 into a sheet 20a. The sheet 20a of the photosensitive material 20 is set in an exposure section 24. An exposure window 25 is formed in the separating wall 11 in front of the exposure section 24. The exposure section 24 has a camera housing 24a and a shading hood 24b disposed between the camera housing 24a and the exposure window 25. A flash device 26 is disposed above the exposure section 24 and projects light through a diffusion plate 26a to illuminate a human subject 61 to be photographed. The exposure section 24 includes an exposure frame 27, a shutter 28 and a lens cluster 29 which operate to expose the photosensitive sheet 20a to light reflected from the human subject 61 and entering through the exposure window 25.

Figure 1:
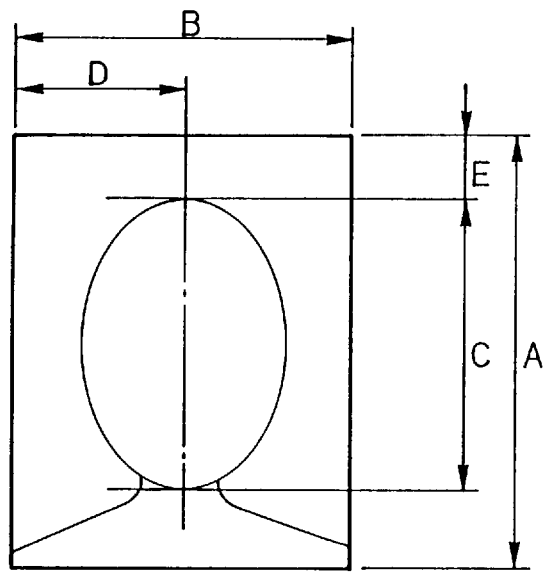
Figure 7:
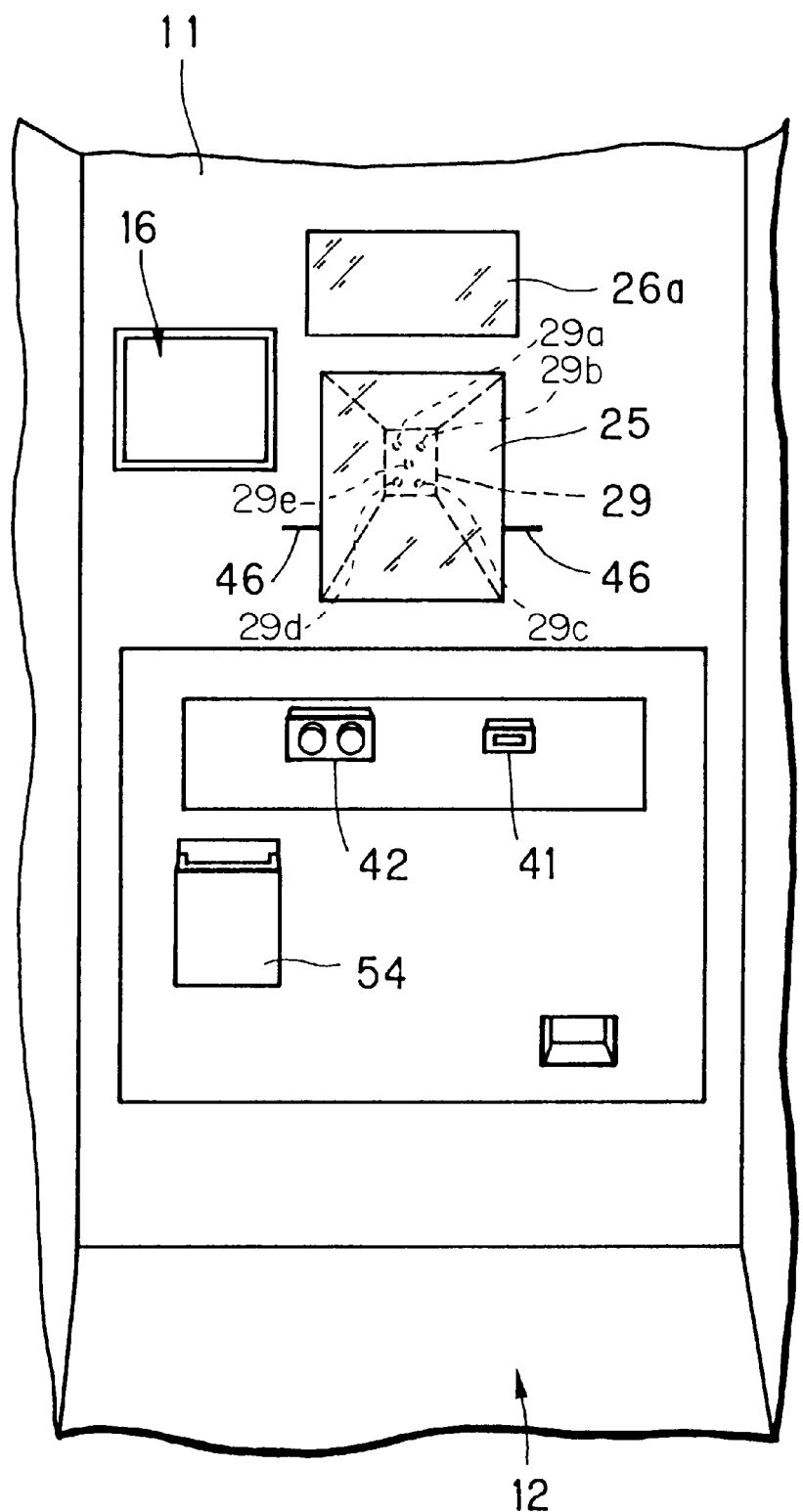
FIG. 7 is a schematic view of a separating wall viewed from an exposure room.
Figure 11:
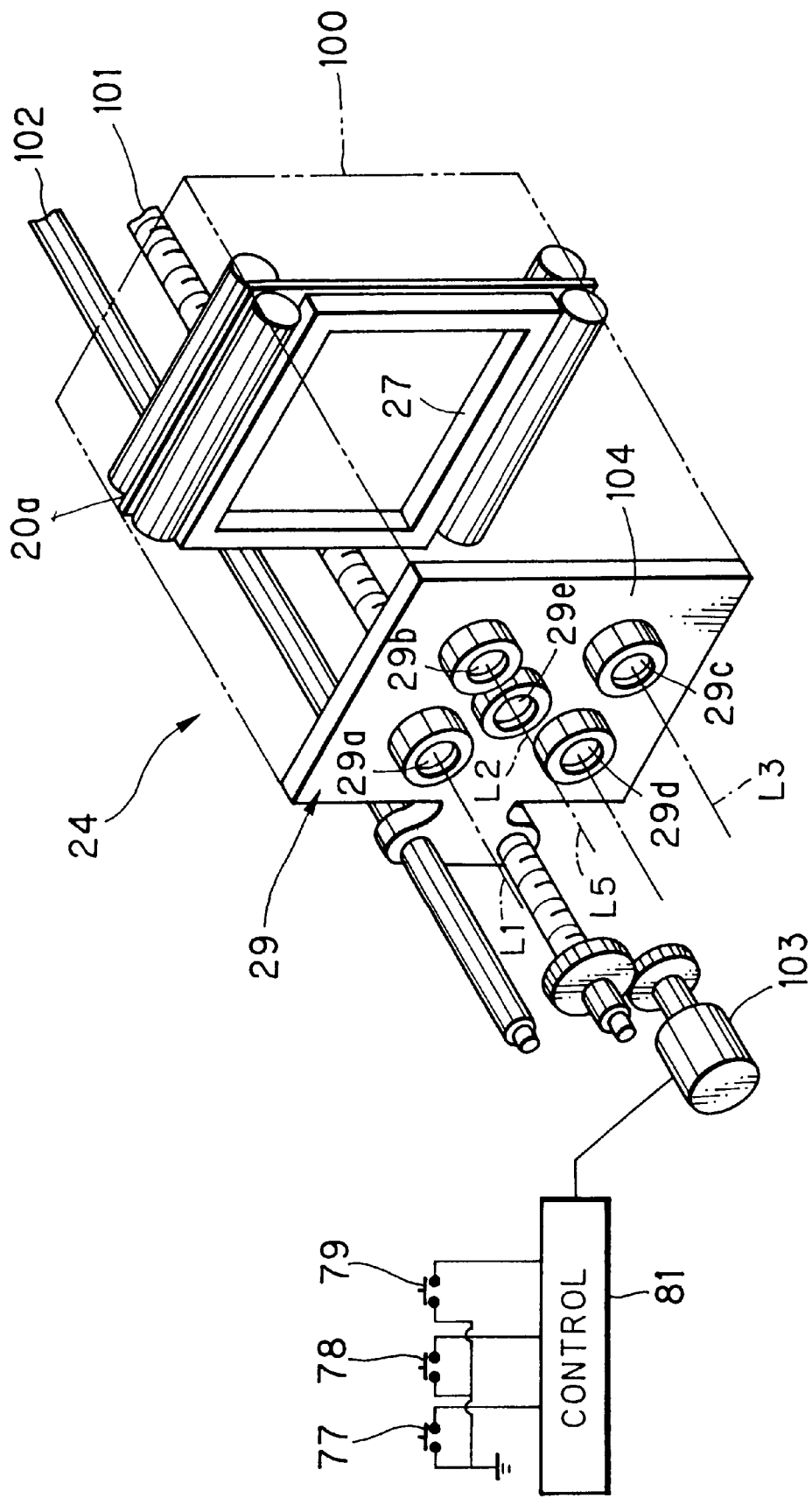
FIG. 11 is a perspective view of an adjustable lens cluster used in a self-photography apparatus according to another embodiment of the present invention.

The lens cluster 29 consists of four taking lenses 29a, 29b, 29c, and 29d having the same focal length and being arranged in a 2×2 matrix, a monitor lens 29e disposed in the center of the taking lenses 29a to 29d, and a lens board 32 holding these lenses 29a to 29e such that respective optical axes L1, L2, L3, L4 and L5 of the lenses 29a to 29e extend parallel to each other (see FIGS. 7 and 11). Four identical image frames, each including a latent facial image of the human subject 61, are photographed on the photosensitive sheet 20a in matrix arrangement through each of the four taking lenses 29a–29d, respectively. Each image frame accords with the standard as discussed above with reference to FIG. 1.

Referring to FIG. 6, a reflecting mirror 34 is disposed behind the monitor lens 29e to direct the light, reflected from the human subject 61 and passing through the monitor lens 29e, toward an image area sensor 33 (a CCD, for example). The image area sensor 33 detects, from the incident light, an image signal for generating an image signal of the video facial image 17 and sends the image signal to an image processor 36 for correcting density, gradation and color of the video image 17. The image processor 36 connects to an index image generator 37 which generates a supplementary image signal for displaying indices 40a to 40f on the CRT display 16. The image processor 36 thus composes the image signal for the video image 17 with the supplementary image signal for the indices 40a to 40f, and sends the composite image signal to the CRT display 16.

A controller 39 controls the image processor 36, the index image generator 37 and the CRT display 16 to display the video image 17 in combination with the indices 40a to 40f in response to a coin count signal which is generated when a given number of coins or currency have been inserted into a slot 41 (see FIG. 7). Thereafter, when a start signal is input by actuating a start button 42, the controller 39 activates the exposure section 24 to execute the exposure with a predetermined time lag from the start button actuation.

The indices 40a to 40f include a horizontal line 40a indicating a reference position of the chin, four horizontal lines 40b to 40e extending above the reference line 40a in order from the bottom, and characters or marks 40f representing the face size in small "S", middle "M" and large "L" gradation in relation to the lines 40a to 40e. Specifically, if the crown of the subject's head of the video image 17 of the subject is in a horizontal zone between the line 40b and the line 40c, the face size is determined to be "S". If the crown of the head is in a zone between;the line 40c and the line 40d, the face size is detected "M". If the crown of the head is in a zone between the line 40d and the line 40e, the face size is determined "L".

The line 40b corresponds to the position where the crown of the subject's head of the video image 17 is located if the face size, that is, the length from the crown of the subject's head to chin, is 19 cm. In the same way, the line 40c corresponds to the face size of 22 cm, the line 40d to 27 cm, and the line 40e to 30 cm. Therefore, in the present embodiment, the "S" size means the subject's face size is equal to or more than 19 cm and less than 22 cm, the "M" size means the subject's face size is equal to or more than 22 cm and less than 27 cm, and the "L" size means the subject's face size is equal to or more than 27 cm and less than 30 cm.

In this way, the range of the face size can be detected from the CRT display 16 if the chin of the displayed video image 17 is in alignment with the reference line 40a. In the example shown in FIG. 3, the crown of the head of the video image 17 is in the zone associated with the mark "M", so that the face size is "M". In the alternative, it is possible to set a reference line for the position of the crown of the subject's head. It is also possible to display the corresponding numerical values of the face size on the respective lines 40b to 40e, instead of the size marks 40f.

The exposure room 12 is provided with a chair 43 and an index 45 indicating three object distance ranges to which the same marks 45a as the size marks 40f are allocated. The index 45 is disposed on an inner wall portion located on one side of the face of the human subject 61 sitting on the chair 43, and extends horizontally so that the human subject 61 can adjust the horizontal position of his or her face in the direction of the optical axes L1 to L5 of the lenses 29a to 29e in accordance with the determined face size, by placing his or her face in one of the three object distance ranges that are designated by the same mark 45a of the index 45 as the corresponding size mark 40f.

Because the exposure room 13 is dark, the exposure window 25 functions as a mirror for reflecting the face of the human subject 61 to be photographed. Lines 46 provided on opposite horizontal sides of the exposure window 25 designate the position of the chin of the human subject 61 reflected in the exposure window 25 (see FIG. 7). The chair 43 is adjustable in height by swiveling a sitting portion 43a about a support shaft 43b which is secured to the floor of the exposure room 12. The height of the chair 43 is adjusted to bring the chin reflected in the exposure window 25 into alignment with the lines 46. In alternative, the lines 46 may designate a reference position for the eyes or the crown of the head (see FIG. 4).

The photosensitive sheet 20a having been exposed in the exposure section 24 is coated with a small amount of water in a water supply section 48, and is sent to a heat development section 51 together with a sheet of image receiving material 50 which is fed from an image receiving material chamber 49. In the heat development section 51, the exposed photosensitive sheet 20a is tightly overlaid on the image receiving sheet 50. Thereafter, these sheets 20a and 50 are heated together to transfer the images recorded on the photosensitive sheet 20a to the image receiving sheet 50.

Figure 5:
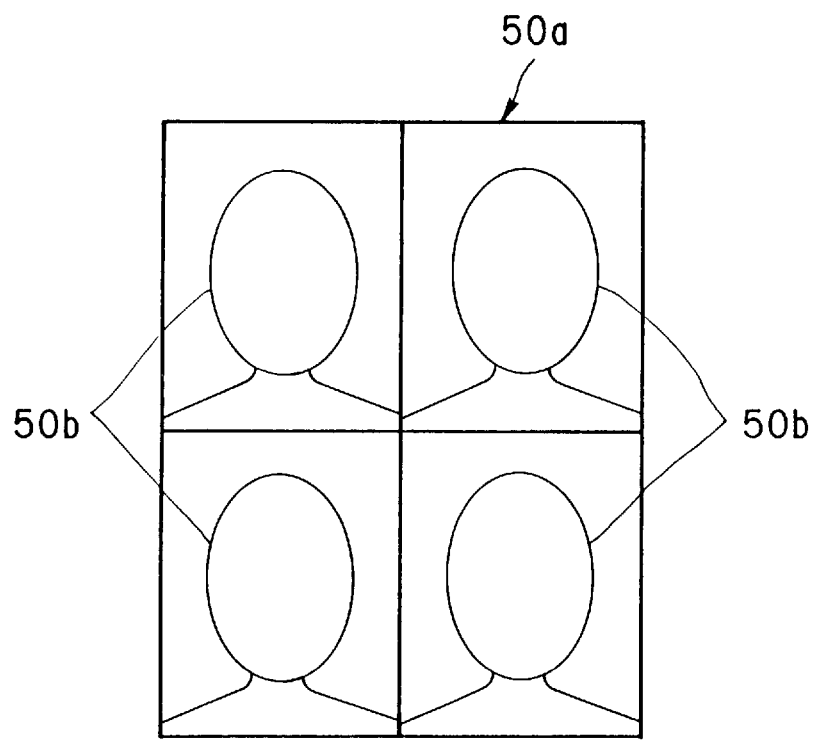
FIG. 5 is a schematic view of a photograph made according to the preferred embodiment.
Figure 2:
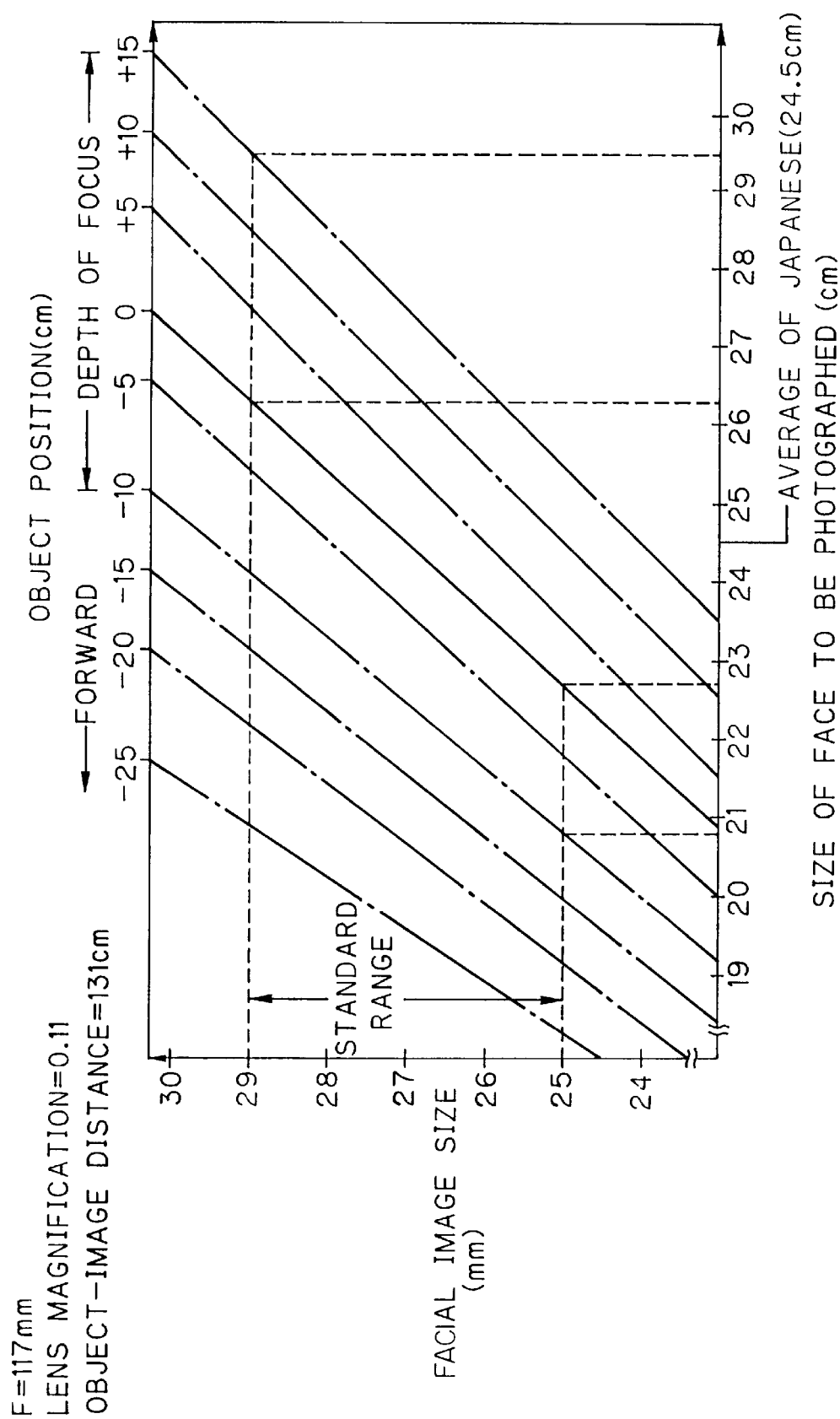
FIG. 2 is a graph showing a relationship between the actual face size of a subject and the facial image size of a resulting portrait.

After the heat development and image transfer, the photosensitive sheet 20a and the image receiving sheet 50 are separated from each other in a separating and ejecting section 52, to eject the image receiving sheet 50 having developed positive images thereon through an outlet 54. The ejected image receiving sheet 50 constitutes a photograph 50a having four image frames arranged in a matrix as shown in FIG. 5. The four image frames are equal in size and include identical facial images 50b of the human subject 61, which are equal in magnification and conform to the standard discussed above with reference to FIG. 1. The used photosensitive sheet 20a is discarded in a waste box 55.

The operation of the above-described self-photography apparatus is as follows:

The person who wants to be photographed sits on the chair 43 and then adjusts the height of the chair 43 to set his or her chin, as reflected in the exposure window 25, in alignment with the lines 46.

When the given number of coins or currency has been inserted into the slot 41, the controller 39 receives the coin count signal and activates the image processor 36 and the index image generator 37, to cause the CRT display 16 to display the video image 17 of the face of the human subject 61 in combination with the indices 40a to 40f. Since the vertical position of the face has been adjusted with reference to the lines 46, the chin of the video image 17 is on the reference line 40a on the CRT display 16. Therefore, the human subject 61 is sitting on the chair 3 can detect his or her face size from the size mark 40f displayed in the zone where the crown of the head of the video image 17 is located on the CRT 16.

Then, the human subject 61 can adjust the horizontal position of his or her face in correspondence with the detected face size by positioning his or her face in the corresponding object distance range indicated by the index 45. When the human subject 61 actuates the start button 42 after confirming that the chin is still in alignment with the line 46 in the exposure window 25, the controller 39 receives the start signal. A predetermined time thereafter, the controller 38 activates the exposure section 24 to perform an exposure of the photosensitive sheet 20a previously set in the exposure frame 27 of the exposure section 24. As a result, four identical facial images 50b are photographed on the photosensitive sheet 20a. Thereafter, water is applied to the photosensitive sheet 20a and it is pressed together with the image receiving material sheet 50 for a heat development process.

The image receiving material 50 having the heat developed facial images 50b is ejected as the identification photograph 50a through the outlet 54. Because the object distance is changed according to the actual face size of the human subject 61 without departing from the range of the depth of focus of the camera device, the facial images 50b on the photograph 50a accord with the standard discussed above with reference to FIG. 1.

Figure 8:
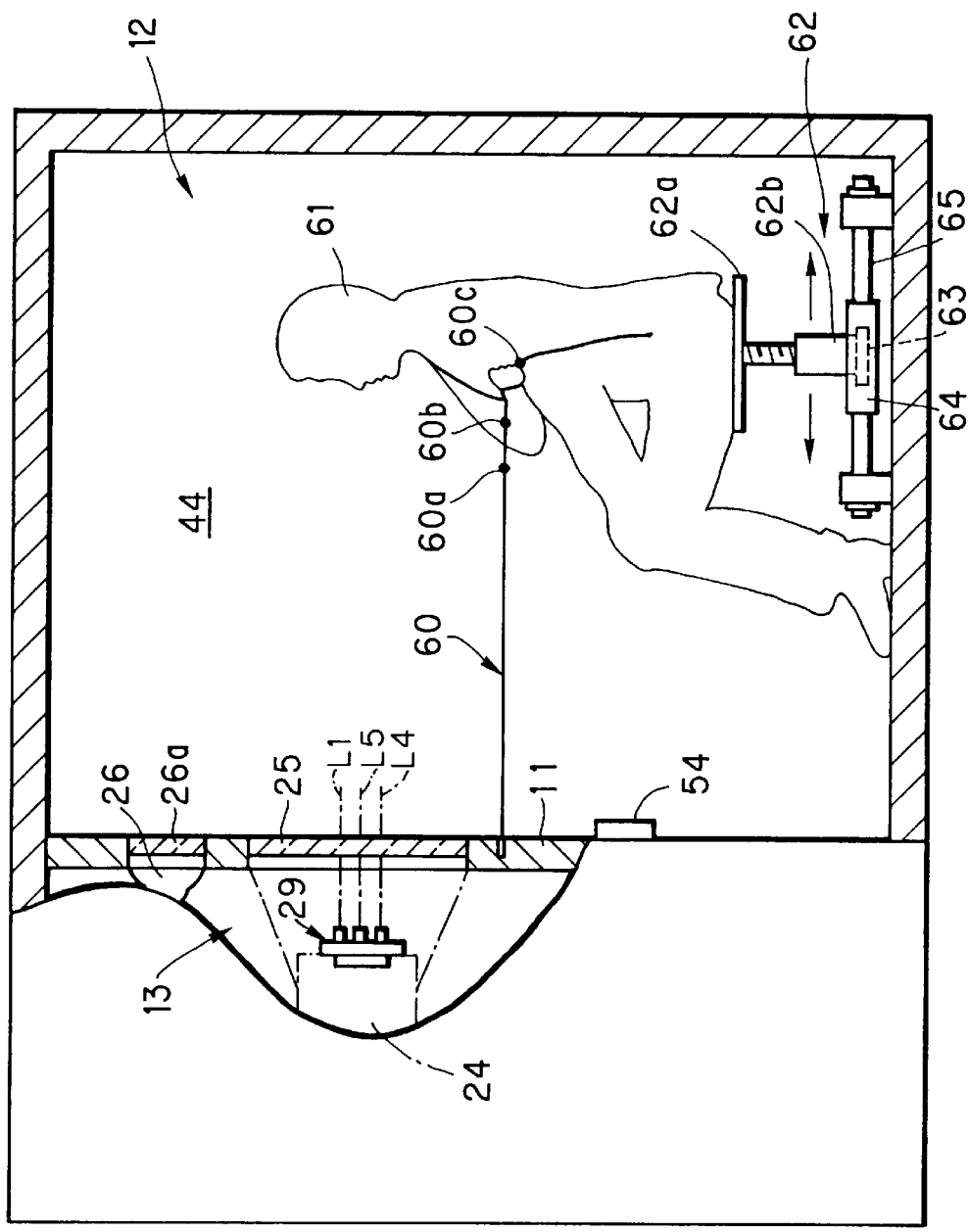
FIG. 8 is a cut-away view of a self-photography apparatus according to another embodiment of the present invention, in partial section.

Although the object distance or the horizontal position of the face in the direction of the optical axes L1 to L5 is adjusted with reference to the index 45 provided on the inner wall portion of the exposure room 12 in the above-described embodiment, it is possible to use a string 60 with three marks such as knots 60a, 60b and 60c, as shown in FIG. 8. The knots 60a to 60c are disposed in positions corresponding to three object distances suitable for the three face size ranges. One end of the string 60 is secured to a separating wall 11 below an exposure window 25, and a human subject 61 sitting on a chair 62 puts one of the three knots 60a to 60c on his or her chest in accordance with his or her face size to set his or her face in the suitable object distance position.

Figure 9:
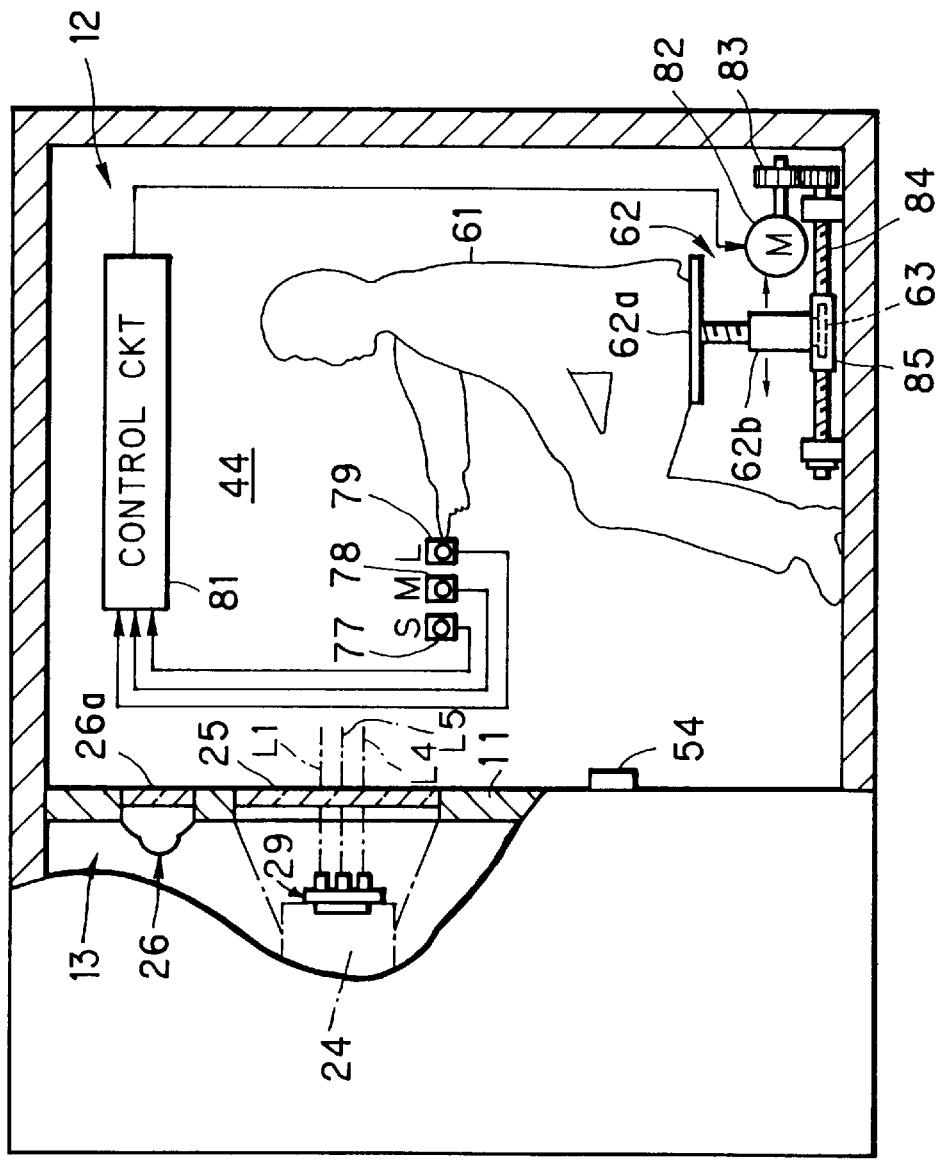
FIG. 9 is a view similar to FIG. 8, but showing another embodiment of the present invention.

In the embodiment shown in FIG. 8, the chair 62 is not only adjustable in height in the same way as the chair 43, but also movable in the direction of the optical axes of a lens cluster 29. The chair 62 is constituted of a sitting portion 62a, and a threaded sleeve portion 62b about which the sitting portion 62a can be swiveled to change the height thereof. A mounting plate 63 is horizontally secured to the bottom end of the threaded sleeve 62b, and a pair of sleeves 64 are secured to opposite sides of the mounting plate 63. The sleeves 64 are slidably fitted on a pair of guide rods 65 disposed parallel to the optical axis direction. It is desirable to provide an index on an inner wall 44 on one side of the chair 62, for indicating a home position of the chair 62 where the face size should be determined. Other constructions and operations may be equivalent to those of the embodiment shown in FIGS. 3 to 7, and thus further description thereof is omitted for brevity. FIG. 9 illustrates an embodiment wherein a chair 62 is automatically moved for adjusting the object position, or distance, based on the face size of the human subject 61. In this embodiment, three selection buttons 77, 78 and 79 are attached to an inner wall 44 for inputting the face size detected with reference to a CRT display 16 in the manner described above. When one of the selection buttons 77 to 79 is depressed, a corresponding signal is input to a control circuit 81. The control circuit 81 controls the direction and amount of rotation of a motor 82 to rotate a lead screw 84 through a gear 83. The lead screw 84 extends parallel to the direction of the optical axes of a lens cluster 29, and a nut 85 is engaged on the lead screw 84. The nut 85 is secured to one side of a mounting plate 63 which is secured to a threaded sleeve portion 62b of a chair 62 in the same way as in the embodiment of FIG. 8. A sleeve similar to the sleeve 64 of FIG. 8 is secured to the opposite side of the mounting plate 63, and slidably fitted on a guide rod similar to the guide rod 65 of FIG. 8.

In response to a coin count signal, a controller 39 first controls the control circuit 81 to reset the chair 62 in a home position, wherein a facial image is displayed on the CRT display 16 for detecting the face size of the human subject 61. Thereafter, when one of the selection buttons 77 to 79 is actuated in accordance with the face size, the motor 82 is caused to rotate to move the nut 85 forward or backward in the optical axis direction through the lead screw 84. Accordingly, the chair 62 is moved into the position corresponding to the face size. It is possible to reset the chair 62 to the home position when an exposure is completed. Other constructions and functions of this embodiment may be similar to those of the above-described embodiments, and thus further description thereof is omitted for brevity.

Figure 10:
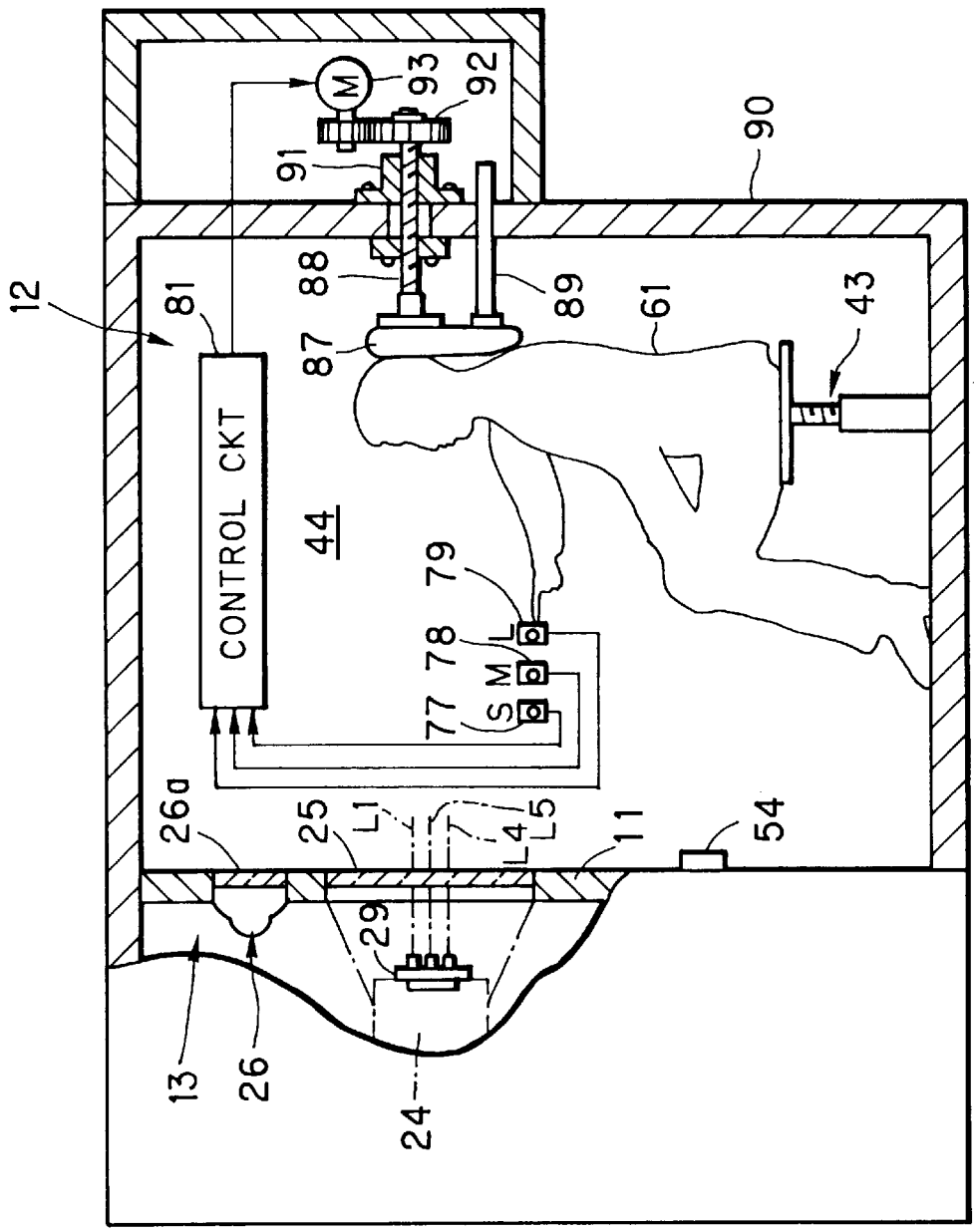
FIG. 10 is a view similar to FIG. 8, but showing a further embodiment of the present invention.

FIG. 10 illustrates an embodiment wherein a headrest 87 is disposed on the back side of the head of a human subject 61 sitting on a chair 43 which is fixed in the direction of the optical axes of a lens cluster 29. Instead, the headrest 87 is movable in the optical axis direction under the control of a control circuit 81 in response to an actuation of one of three selection buttons 77 to 79 selected in accordance with the face size of the human subject 61. A leading end of a lead screw 88 is rotatably attached to the rear side of the headrest 87, and a slide rod 89 is also securely attached to the rear side of the headrest 87. The lead screw 88 is engaged in a nut 91 which is secured to a wall, and rotated by a motor 93 through a gear 92 secured to a trailing end of the lead screw 88. The slide rod 89 is slidably fitted in a bore formed in the wall 90, to prevent the rotation of the headrest 87.

According to this embodiment, the headrest 87 is set in a position corresponding to the face size. Therefore, the size or magnification of the photographic facial images is suitably adjusted when the back of the head is rested against the headrest 87. It is to be noted that the headrest 87 should be dimensioned such that any part of the headrest 87 could not be photographed, i.e., the entire headrest is behind the head of the human subject 61. The headrest 87 preferably has the same color as the wall 90. Thereby, if the headrest 87 should partly protrude beyond the head, it would not adversely affect the quality of the consequent photograph. Also, the headrest 87 is automatically reset to a home position when the face size is determined. Other constructions and functions of this embodiment may be similar to those of the embodiment shown in FIGS. 3 to 7, and thus further description thereof is omitted for brevity.

It is also possible to adjust the size of photographic images by adjusting the taking lens system. According to the embodiment shown in FIG. 11, a camera housing 100 of an exposure section 24 is supported by a lead screw 101 and a guide rod 102 to move in the direction of optical axes L1 to L5 of a lens cluster 29 consisting of four taking lenses 29a to 29d, a monitor lens 29e, and a lens board 104, when the lead screw 101 is rotated by a motor 103 under the control of a control circuit 81. Thereby, the camera housing 100 can move together with the lens cluster 29 and a photosensitive sheet 20a set in an exposure frame 27 in accordance with the face size selected through selection buttons 77 to 79, such that the size of facial images is changed along with the depth of focus. Also in this embodiment, the camera having 100 is placed in a home position for determining the actual face size of the human subject 61. Other constructions and functions of this embodiment may be similar to those of the above-described embodiments, and thus further description is omitted for brevity.

Figure 12:
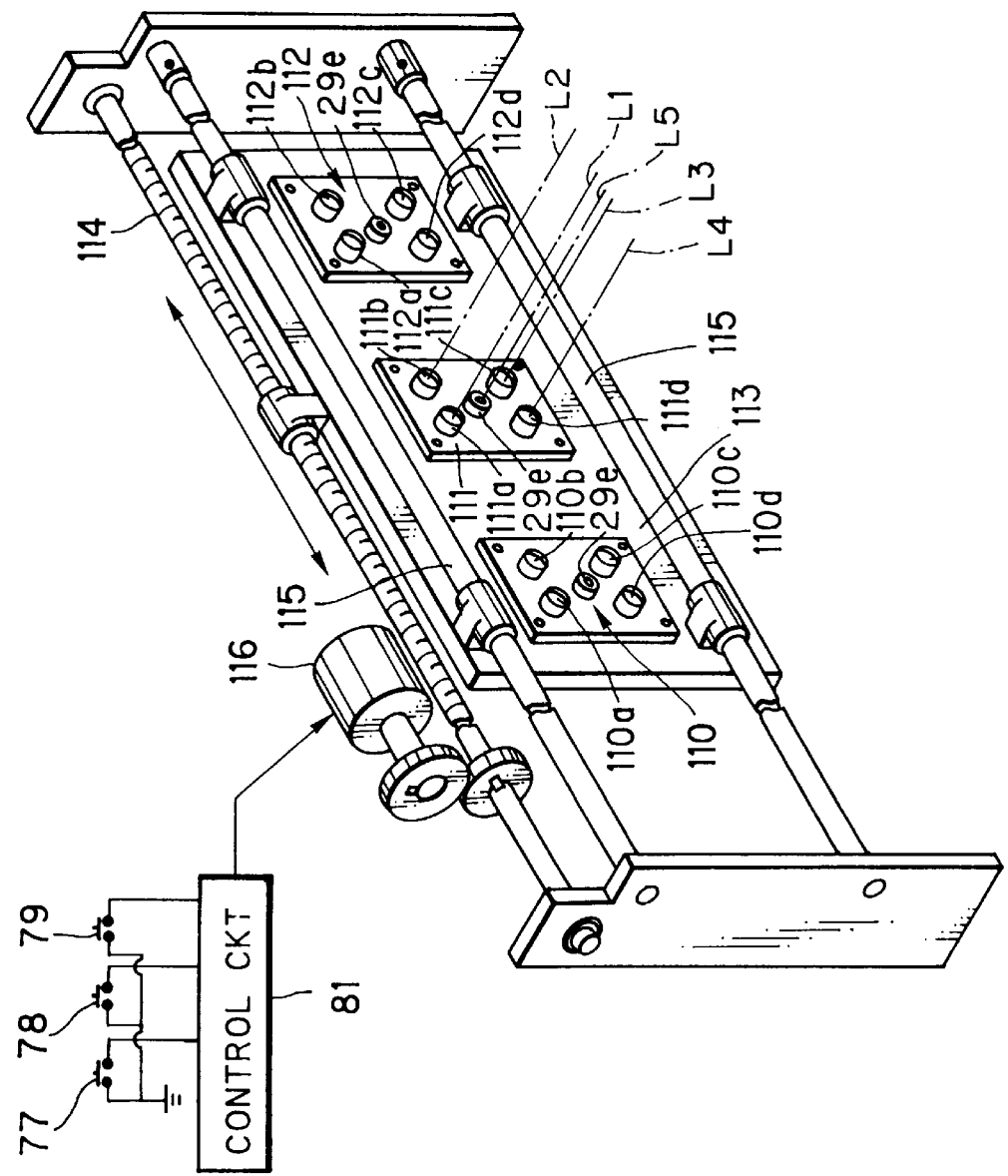
FIG. 12 is a perspective view of a lens cluster system including three lens clusters according to another embodiment of the present invention.
Figure 13:
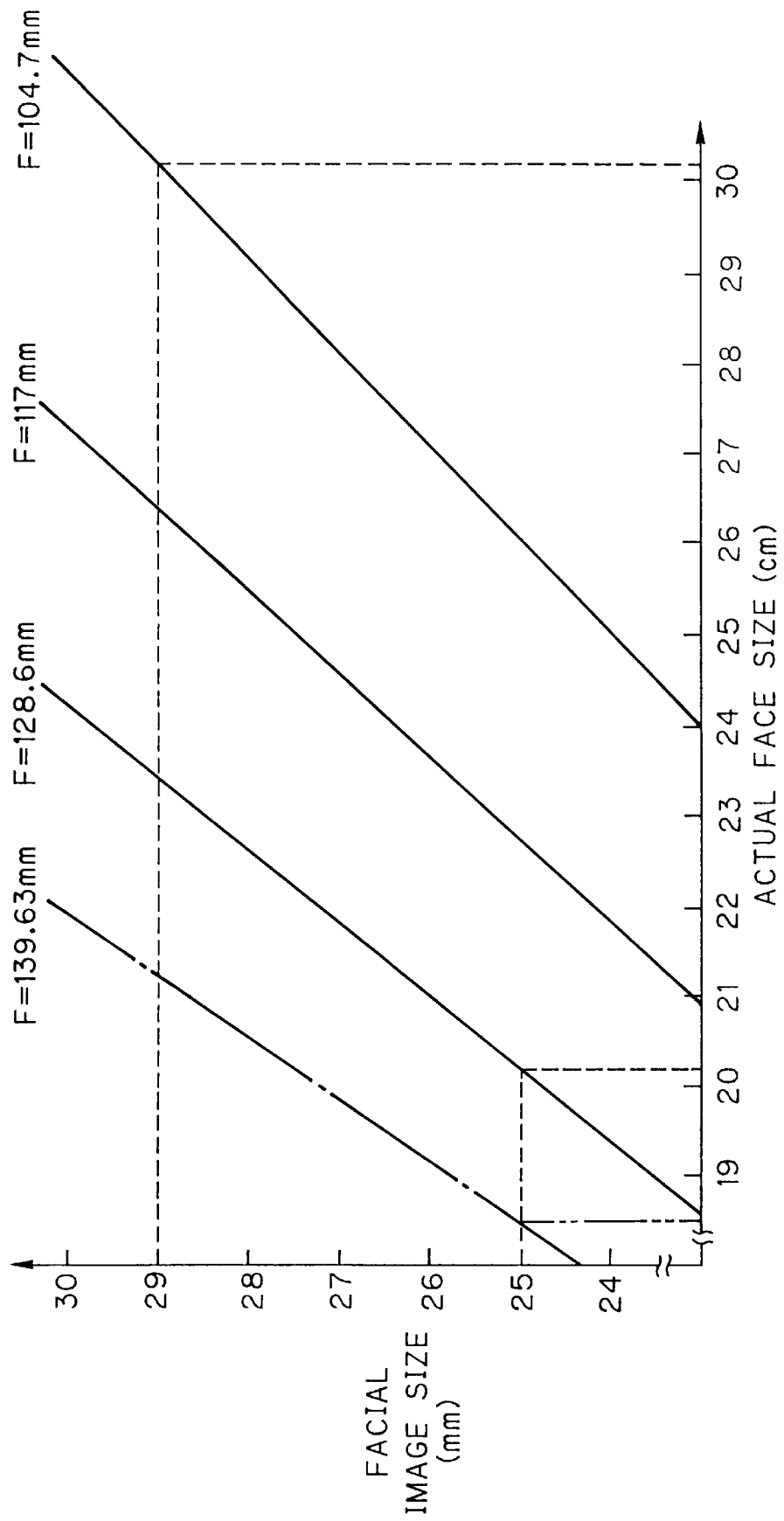
FIG. 13 is a graph showing a relationship between the resulting facial image size and the actual face size of a subject and the focal length of the lens cluster.

FIG. 12 shows an embodiment wherein one of three kinds of lens clusters 110, 111 and 112 whose taking lenses have different focal lengths from each other, is selectively used. The three lens clusters 110 to 112 are mounted in a common plate 113, and each has four taking lenses arranged in a matrix and a monitor lens 29e disposed in the center of the taking lenses. The taking lenses 110a, 110b, 110c and 110d of the first lens cluster 110 have a focal length F of 117 mm. The taking lenses 111a, 111b, 111c and 111d of the second lens cluster 111 have a focal length F of 128.6 mm. The taking lenses 112a, 112b, 112c and 112d of the third lens cluster 112 have a focal length F of 104.71 mm. Thereby, it is possible to produce the standardized photographs from faces of 19 cm to 30 cm in size or length, as is shown in FIG. 13.

The plate 113 is carried by a lead screw 114 and a pair of guide rods 115 to slide in a direction perpendicular to optical axes of the lens cluster 110 to 112 as shown by an arrow. When the face size is selected by selection buttons 77 to 79, a control circuit 81 outputs a corresponding signal to a motor 116. Then, the motor 116 is driven to rotate the lead screw 114 to move the plate 113 to set a corresponding one of the three lens clusters 110 to 112 in an exposure position. Thereby, and exposure is executed through the lens cluster set in the exposure position.

It is, of course, possible to provide more than three kinds of lens clusters. For example, a lens cluster having a focal length F of 139.63 mm may be added to the above lens clusters. Thereby, it becomes possible to produce the standardized photographs from faces of 18.5 cm to 30 cm in length, as shown in FIG. 13.

Figure 14:
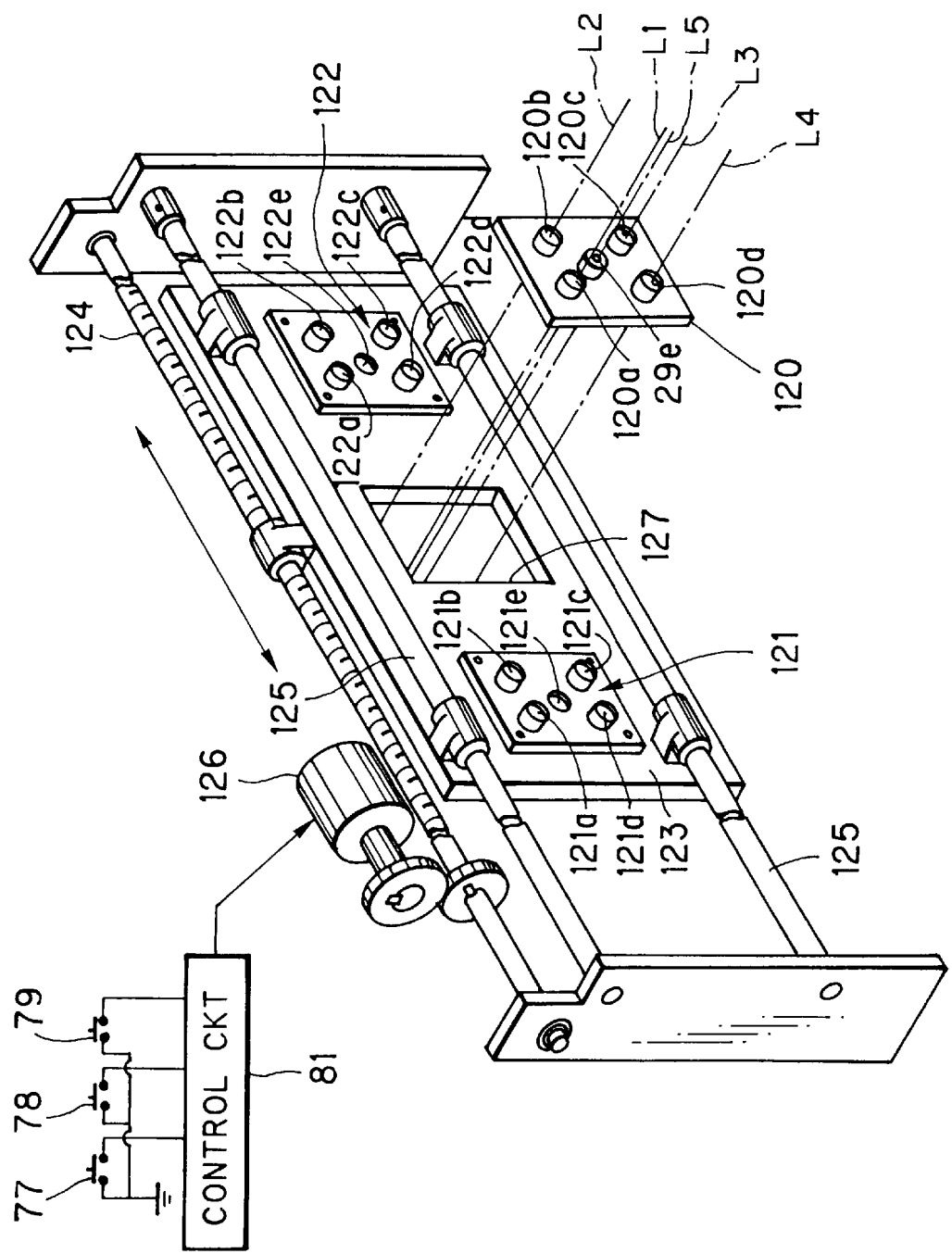
FIG. 14 is a view similar to FIG. 12, but showing another embodiment of a lens cluster system.

An embodiment shown in FIG. 14 has a master lens cluster 120 and two kinds of conversion lens clusters 121 and 122. Either the conversion lens cluster 121 or 122 can be removably inserted behind the master lens cluster 120, such that four taking lenses 121a to 121d or 122a to 122d of the conversion lens cluster 121 or 122 are positioned in coaxial with optical axes L1 to L4 of four taking lenses 120 to 120d of the master lens cluster 120, respectively. Thereby, three different optical systems can be provided by the master lens cluster 120 alone and the combination of the master lens cluster 120 with one of the conversion lens clusters 121 and 122.

The conversion lens clusters 121 and 122 are mounted on a panel 123 which is slidable along guide rods 125 in a direction which is perpendicular to the optical axes as shown by an arrow, when a motor 126 is driven by a control circuit 81 to rotate a lead screw 124. The control circuit 81 operates in response to selection buttons 77 to 79 in accordance with the face size.

The panel 123 has an opening 127 formed between the conversion lens clusters 121 and 122, which is placed behind the master lens cluster 120 when using the master lens cluster 120 alone. When one of the conversion lens clusters 121 or 122 is combined with the master lens cluster 120, a hole 121e or 122e is positioned on an optical axis L5 of a monitor lens 29e of the master lens cluster 120.

In the alternative, it is possible to use zoom lenses for taking lenses, and drive the zoom lenses by a motor to adjust the focal length in accordance with the face size.

FIG. 15 shows another embodiment wherein indices are displayed on the CRT display 16. The indices 130 of this embodiment include two lines 130a and 130b indicating the respective standard positions for the crown of the head and for the chin. The human subject 61 who wants to be photographed adjusts his or her position to make the size of facial image displayed on the CRT display 16 fit with the lines 130a and 130b. The object position or distance may be adjusted by manually or automatically moving a chair or a headrest in the same way as described with reference to FIG. 8, 9 or 10.

It is possible to provide lines for judging the face size by attaching black tape or the like on the display screen, thereby rendering the index image generator 37 unnecessary. Also, the CRT display 16 may be replace by an LCD (liquid crystal display). Although the facial images are photographed in a 2×2 matrix arrangement, it is possible to arrange the facial images in a column, or other format.

Figure 16:
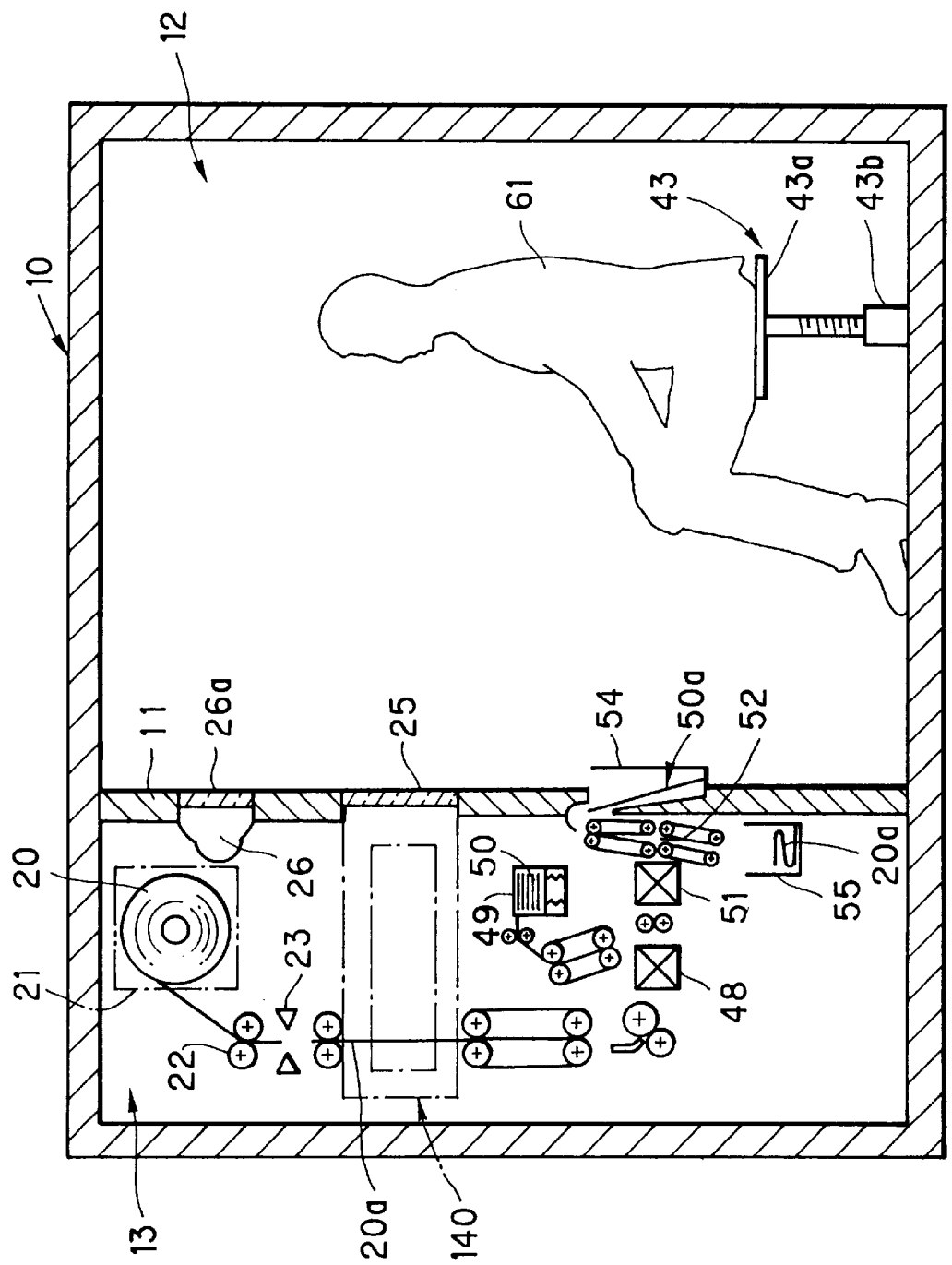
FIG. 16 is a view similar to FIG. 4, but showing another embodiment of the present invention wherein a video printer section is provided.
Figure 17:
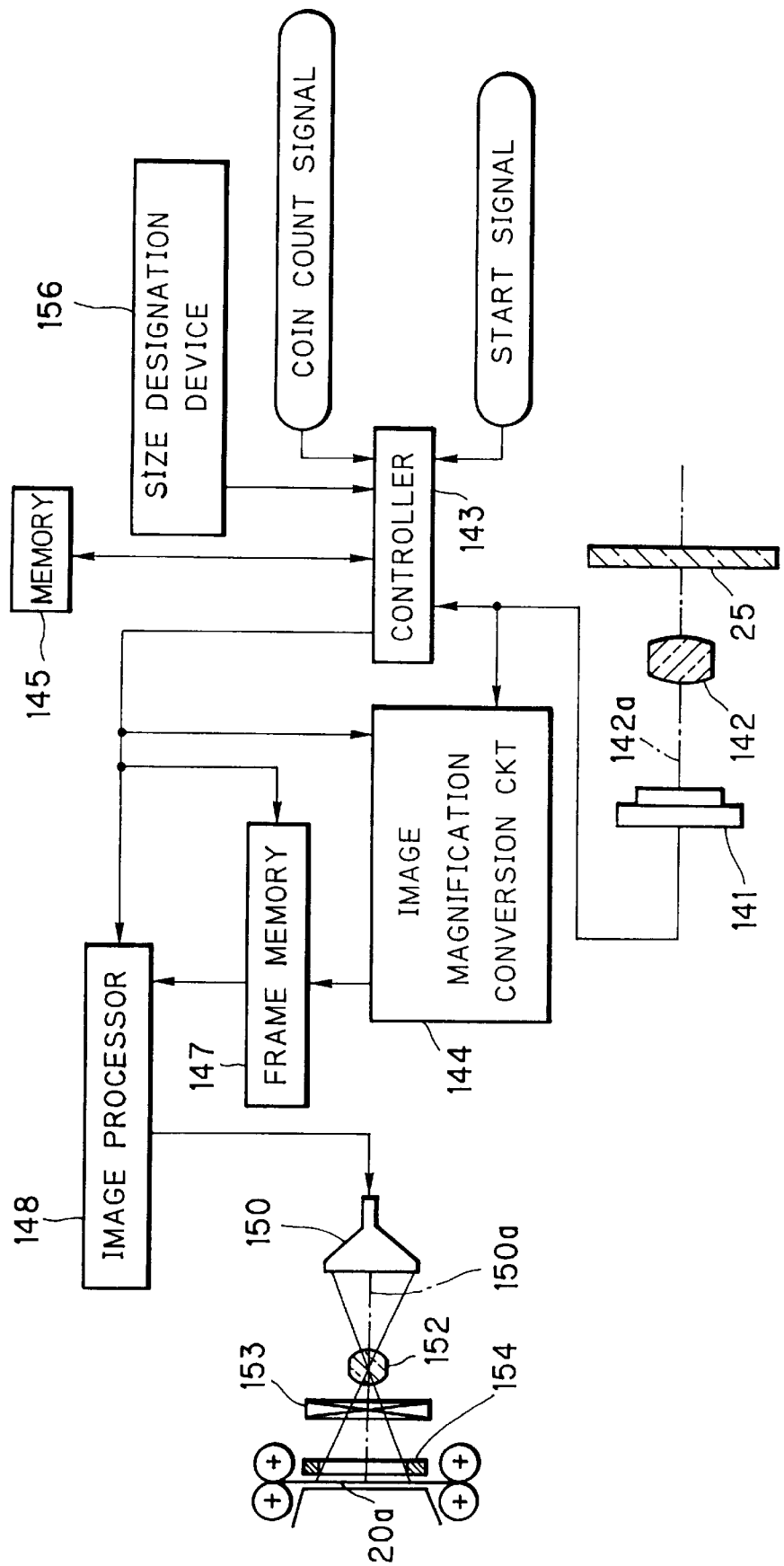
FIG. 17 is a control diagram of the video printer section of the embodiment shown in FIG. 16.
Figure 18:
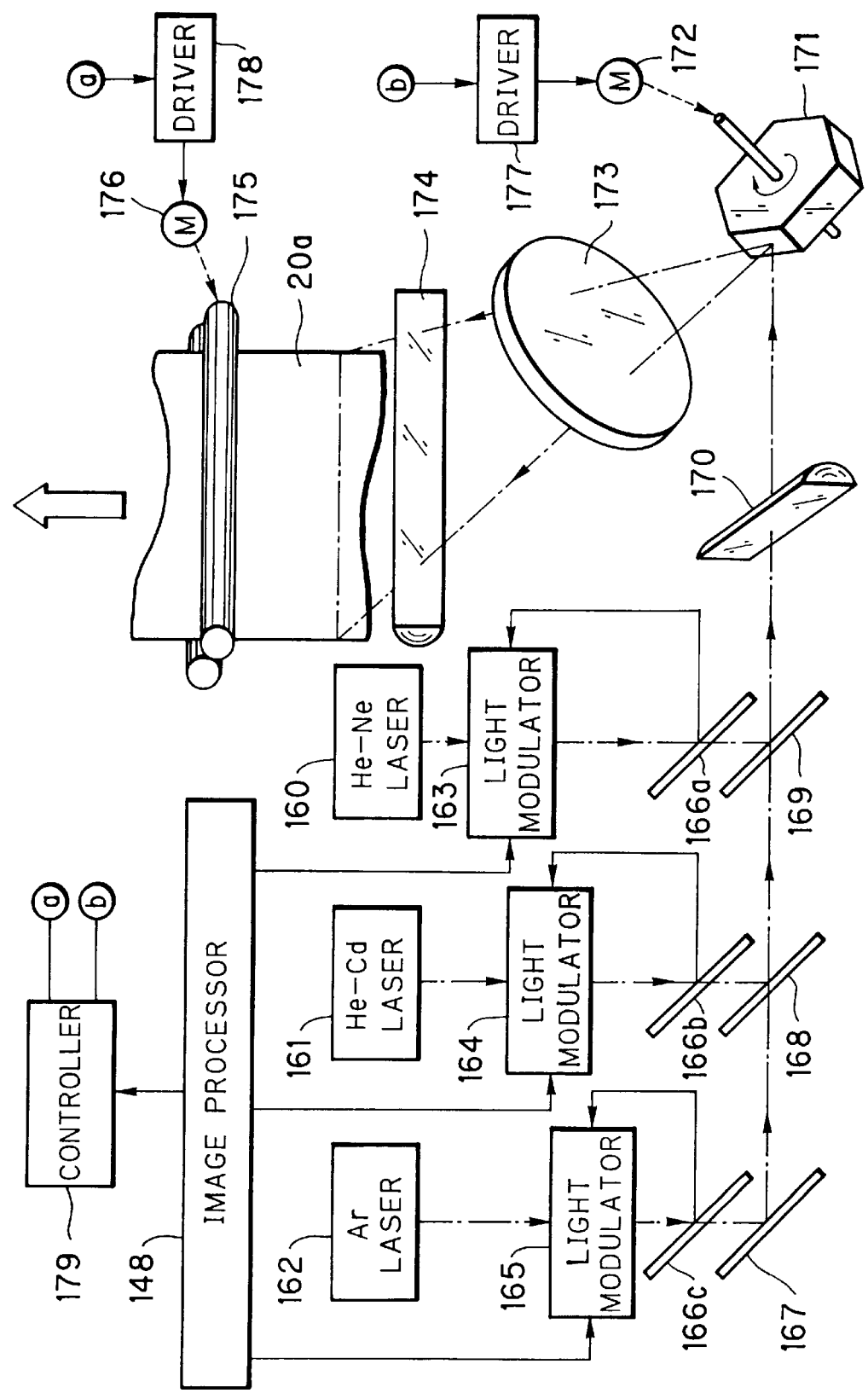
FIG. 18 is a schematic view of a scanning type line printer used as a video printer for a self-photography apparatus according to another embodiment of the present invention.

FIGS. 16 to 18 illustrate embodiments having a device for picking up a facial image of a human subject 61 as a photographic object, a device for automatically determining the size of the facial image and converting the magnification of image in accordance with the determined face size, and a device for recording the facial image at the converted magnification onto a recording medium through a video printer. Because the size of the facial image is automatically adjusted according to the standard, there is no need for a monitoring device such as the CRT display 16 as used in the above-described embodiments, and a video printer section 140 is disposed behind an exposure window 25, in place of the exposure section 24. Other essential constructions of this embodiment may be similar to those shown in FIGS. 3 and 4.

As shown in FIG. 17, the video printer section 140 includes an image area sensor 141 and a focusing lens 142 for focusing light 142a reflected from the photographic subject 61 and passing through the exposure window 25 onto the image area sensor 141. Accordingly, an image signal of the facial image of the subject 61 is picked up by the image area sensor 140 and sent therefrom to a controller 143 and an image magnification conversion circuit 144.

The controller 143 derives a contour of the facial image from the image signal, and comprises the contour with a reference contour previously memorized in a memory 145. According to the result of the comparison, the controller 143 determines an optimum value of the image magnification, and sends a corresponding magnification signal to the image magnification conversion circuit 144. The image magnification conversion circuit 144 processes the image signal to change the size of the facial image in accordance with the magnification signal, for example, by interpolating or thinning the image signal. Of course, the image magnification is not changed if the face size is in the standard range.

The image signal having been converted is temporarily stored for each frame in a frame memory 147. The controller 143 reads the frame memory 147 to send the image signal to an image processor 148. The image processor 148 then edits the image signal to fit one frame into each of quarter sections of a screen which are arranged in a 2×2 matrix on a CRT display 150, and sends the edited image signal to the CRT display 150 for a period of time.

The CRT display 150 thus displays a composite video image including four identical frames of the picked-up facial image arranged in a matrix. A printing lens 152, a shutter 153 and an exposure frame 154 are disposed in front of the CRT display 150 in coaxial relation with an optical axis at the center of the screen.

The embodiment shown in FIG. 17 operates as follows:

The human subject 61 who wants to be photographed sits on a chair 43 and adjusts the height of the chair 43 by swiveling a sitting portion 43a about a support shaft 43b to bring the chin into alignment with reference lines 46 while looking in the exposure window 25, in the same way as described with reference to FIG. 3.

When a given number of coins or currency have been inserted into a slot 41, the coin count signal is input to the controller 143. Thereafter, when the start signal is input through t button 42, the controller 143 activates a flash device 26 with a predetermined time lag, to illuminate the human subject 61 sitting on the chair 43 through a diffusion plate 26a. Light reflected from the face is picked up by the image area sensor 141 in the form of the image signal. The image signal is sent to the controller 143 and the image magnification conversion circuit 144. The controller 143 derives a contour of the facial image from the image signal, and compares the contour with the reference contour read from the memory 145 to determine the face size, and sends a corresponding magnification signal to the image magnification conversion circuit 144. The image magnification conversion circuit 144 thins the image signal to reduce the size of the facial image if the face size is too large, or interpolates the image signal to enlarge the size of the facial image if the face size is too small. The image magnification is not changed if the face size is in the standard range.

The image signal having been converted in magnification is stored in the frame memory 147. The image processor 148 edits the image signal read from the frame memory 147 to cause the CRT display 150 to display a composite video image having four identical facial image frames fitted in the quarter sections.

The photosensitive sheet 20a, which has been cut from a photosensitive material 20 fed from a magazine 21, is set in the exposure frame 154 prior to the shutter 153 is activated to open for a predetermined time. The photosensitive sheet 20a thus exposed is heat developed in the same way as described with reference to FIG. 4. As a result, an identification photograph 50a having four standardized facial image frames is produced.

The CRT display 150 may be replaced by an LCD device. Also, it is possible to make full-color identification photographs by using a color CRT display, a black and white CRT display with color filters, or a color LCD device. The identical facial images may be arranged in a column in a photographic print, or in any other desirable format.

FIG. 18 shows an embodiment which uses a scanning type color line printer as a video printer. An image processor 148 reads a video signal of one frame from a frame memory 147, and composes the video signal into a composite video signal for printing four identical images within a frame. The composite video signal is sent to a line printer unit through an interface. The line printer unit has a He—Ne laser 160 for radiating red light, a He—Cd laser 161 for radiating green light, an Ar laser 162 for radiating blue laser 162. Laser beams from the laser devices 160 to 162 are modulated by light modulators 163, 164 and 165, respectively, in accordance with the image signal from the image processor 150. In order to check at the start of printing whether the intensities of the laser beams are proper, a portion of the laser beams are picked up by beam splitters 166 and fed back to the light modulators 163 to 165, when the intensities of the laser beams have been modulated in accordance with a standard image signal. Instead of gas lasers, semiconductor lasers, or any other appropriate light source, may also be used.

The laser beams, modulated in accordance with the image signal, are converted into a single beam by a mirror 167, and dichroic mirrors 168 and 169. This single beam is changed to a parallel beam by a known collimator optical system (not shown), and thereafter directed to fall incident upon a polygonal mirror 171 via a cylindrical lens 170. The polygonal mirror 171 is rotated by a motor 172 at a high speed so that the laser beam is moved in the transverse direction with respect to a photosensitive material 20*a*, performing one main scanning per each face of the polygonal mirror 171. The laser beam deflected by the polygonal mirror 171 is converged to a spot having a beam diameter corresponding to the pixel density, by a focussing optical system consisting of a fθ lens 173 and a cylindrical lens 174, and applied to the photosensitive material 20*a*.

A pair of feed rollers 175 are rotated by a motor 176 to feed the photosensitive material 20*a* in the sub scanning direction synchronously with the main scanning of the laser beam. The motors 172 and 176 are driven by drivers 177 and 178, respectively, under the control of a controller 179 in response to a synchronizing signal from the image processor 148. With the sub scanning by the feeding of the photosensitive material 20*a* and the main scanning by the laser beams, the composite image is exposed on the photosensitive material 20*a*.

Although all the embodiments of the present invention have been described with respect to a case where four identical facial images are recorded at the same magnification, it is possible to record the facial images at various magnifications. For example, two of the four facial images may be recorded in accordance with the standard for a passport, and the other two may be recorded in accordance with a standard for a driver's license. In that case, several keys for designating the size of the identification photographs to be made may be provided in the exposure room 12. When the magnification of image is different within the four facial images of the same object, the size of the frame of each facial image may be correspondingly different or can be equal to one another. If the frame size is equal, it is preferable to print a trimming line in the frame to be trimmed in accordance with the desired standard.

The present invention may be useful not only for silver salt photography, but also to thermal recording, electrophotography, ink jet recording, and other recording methods. As for the thermal recording, sublimation transfer recording material, wax transfer recording material, or thermosensitive material may be used. For the electrophotography or the ink jet recording, a wood-free paper should be used as the recording material. In case of the silver salt photography, it is possible to use instant photographic material other than the heat-development type material. Finally, control of the invention can be accomplished through known sensors coupled to a microprocessor-based control device, or the like, which is programmed in a desired manner.

While the present invention has been described in detail with reference to preferred embodiments shown s in the drawings, it will be apparent to those skilled in the art that various changes and modification of the present invention are possible without departing from the scope of the invention as defined in the following claims.

What is claimed is:

1. A self-photography apparatus for marking a photography having at least a facial image of a human object in response to a start signal inputted by said human subject, said self-photography apparatus comprising:

an imaging device for picking up an image signal representing said facial image of said human object;

a detection device connected to said imaging device for detecting the size of a face of said human object, said detection device comprising a first mark at a position corresponding to the position of a chin of the facial image and a second mark at a position corresponding to the position of a crown of a head of the facial image;

an adjusting device for adjusting a magnification of an image in accordance with the face size detected by said detection device, so as to cause said facial image to have a predetermined size in said photograph;

a recording device for recording said facial image onto a recording medium at said magnification;

a processing device for processing said recording medium having said facial image recorded thereon so as to produce said photograph; and a display for displaying a video facial image of said human object thereon based on said image signal from said imaging device, said first and second marks being indices provided on said display so as to indicate several grades of the face size, wherein said first mark comprises a horizontal reference line designating a position of a chin of said video facial image, and said second mark comprises a plurality of scale lines extending parallel to said horizontal reference line at various distances therefrom for designating the position of the crown of the head of said video facial image.

2. A self-photography apparatus as recited in claim 1, wherein said indices are displayed on said display device in composition with said video facial image.

3. A self-photography apparatus as recited in claim 1, wherein said indices are fixedly disposed on said display device.

4. A self-photography apparatus for making a photograph having at least a facial image of a human object in response to a start signal inputted by said human subject, said self-photography apparatus comprising:

an imaging device for picking up an image signal representing said facial image of said human object;

a detection device connected to said imaging device for detecting the size of a face of said human object, said detection device comprising a first mark at a position corresponding to the position of a chin of the facial image and a second mark at a position corresponding to the position of a crown of a head of the facial image;

an adjusting device for adjusting a magnification of an image in accordance with the face size detected by said detection device, so as to cause said facial image to have a predetermined size in said photograph;

a recording device for recording said facial image onto a recording medium at said magnification;

a processing device for processing said recording medium having said facial image recorded thereon so as to produce said photograph; and a display for displaying a video facial image of said human object thereon based on said image signal from said imaging device, said first and second marks being indices provided on said display so as to indicate several grades of the face size;

wherein said adjusting device adjusts the distance of said human object from said taking lens device within a depth of focus of said taking lens device, and wherein said adjusting device includes position marks for indicating respective object positions suitable for said respective grades of the face size, and said human object being placed by said adjusting device into a suitable one of said object positions with reference to said position marks, so as to change the object distance.

5. A self-photography apparatus for making a photograph having at least a facial image of a human object in response to a start signal inputted by said human subject, said self-photography apparatus comprising:

an imaging device for picking up an image signal representing said facial image of said human object;

a detection device connected to said imaging device for detecting the size of a face of said human object, said detection device comprising a first mark at a position corresponding to the position of a chin of the facial image and a second mark at a position corresponding to the position of a crown of a head of the facial image;

an adjusting device for adjusting a magnification of an image in accordance with the face size detected by said detection device, so as to cause said facial image to have a predetermined size in said photograph;

a recording device for recording said facial image onto a recording medium at said magnification;

a processing device for processing said recording medium having said facial image recorded thereon so as to produce said photograph; and a display for displaying a video facial image of said human object thereon based on said image signal from said imaging device, said first and second marks being indices provided on said display so as to indicate several grades of the face size, wherein said adjusting device adjusts the distance of said human object from said taking lens device within a depth of focus of said taking lens device, and wherein said adjusting device consists of a string having knots tied therein indicating suitable object distances according to the face size, and a chair movable in an optical axis direction of said taking lens device, said chair being positioned with reference to said knots.

6. A self-photography apparatus for making a photograph having at least a facial image of a human object in response to a start signal inputted by said human subject, said self-photography apparatus comprising:

an imaging device for picking up an image signal representing said facial image of said human object;

a detection device connected to said imaging device for detecting the size of a face of said human object, said detection device comprising a first mark at a position corresponding to the position of a chin of the facial image and a second mark at a position corresponding to the position of a crown of a head of the facial image;

an adjusting device for adjusting a magnification of an image in accordance with the face size detected by said detection device, so as to cause said facial image to have a predetermined size in said photograph;

a recording device for recording said facial image onto a recording medium at said magnification;

a processing device for processing said recording medium having said facial image recorded thereon so as to produce said photograph; and a display for displaying a video facial image of said human object thereon based on said image signal from said imaging device, said first and second marks being indices provided on said display so as to indicate several grades of the face size;

wherein said recording device comprises a taking lens device for focusing the light entering through said exposure window onto said recording medium, a shutter disposed between said taking lens device and said recording medium and activated in response to said start signal, and a camera housing containing said taking lens device and said shutter, and wherein said adjusting device further comprises a selection device operated to select a grade of the face size, with reference to said video facial image and said indices, and a drive mechanism for driving said adjusting device in accordance with said selected face size grade.

7. A self-photography apparatus as recited in claim 6, wherein said adjusting device further comprises a chair movable in an optical axis direction of said taking lens device, said chair being moved by said drive mechanism within a depth of focus of said taking lens device.

8. A self-photography apparatus as recited in claim 6, wherein said adjusting device further comprises a headrest movable in an optical axis direction of said taking lens device, said headrest being moved by said drive mechanism within a depth of focus of said taking lens device.

9. A self-photography apparatus for making a photograph having at least a facial image of a human object in response to a start signal inputted by said human subject, said self-photography apparatus comprising:

an imaging device for picking up an image signal representing said facial image of said human object;

a detection device connected to said imaging device for detecting the size of a face of said human object, said detection device comprising a first mark at a position corresponding to the position of a chin of the facial image and a second mark at a position corresponding to the position of a crown of a head of the facial image;

an adjusting device for adjusting a magnification of an image in accordance with the face size detected by said detection device, so as to cause said facial image to have a predetermined size in said photograph;

a recording device for recording said facial image onto a recording medium at said magnification; and a processing device for processing said recording medium having said facial image recorded thereon so as to produce said photograph, wherein said determining device comprises operation means for deriving a contour of said facial image from said image signal and comparing said contour with a reference contour stored in a memory so as to determine the face size.

10. A self-photography apparatus as recited in claim 9, wherein said adjusting device comprises conversion means connected to said operation means, for processing said image signal so as to electrically convert the magnification of image in accordance with said determined face size.

11. A self-photography apparatus as recited in claim 10, further comprising a designation device for designating more than one of differently standardized dimensions of said photograph, wherein said conversion means converts the magnification of image in accordance with said determined face size so as to record a plurality of said facial images having said differently standardized dimensions designated by said designation device.

12. A self-photography apparatus as recited in claim 10, wherein said recording device comprises a video printer connected to said conversion means for recording said facial image based on said image signal after it has been processed in said conversion means.

13. A self-photography apparatus as recited in claim 11, wherein said recording device comprises a video printer connected to said conversion means for recording said facial image based on said image signal after it has been processed in said conversion means.

14. A self-photography apparatus as recited in claim 12, wherein said video printer comprises a display device for displaying a video image of said human object on the basis of said image signal having, after it has been processed in said conversion means, a printing lens for focusing said video image onto said recording medium, and a shutter disposed between said printing lens and said recording medium.

15. A self-photography apparatus as recited in claim 13, wherein said video printer comprises a display device for displaying a video image of said human object on the basis of said image signal having, after it has been processed in said conversion means, a printing lens for focusing said video image onto said recording medium, and a shutter disposed between said printing lens and said recording medium.

16. A self-photography apparatus as recited in claim 12, wherein said image signal represents a full-color image, and said video printer comprises three types of light sources for radiating three beams of different wavelength ranges, means for modulating the intensities of said three beams in accordance with red, green, and blue image data of said image signal, means for combining said modulated three beams into a single beam, and beam scanning means for scanning said combined single beam in a first direction of said recording medium being transported in a second direction orthogonal to said first direction at a constant speed, and recording said facial image one line after another on said recording medium.

17. A self-photography apparatus for making a photograph having at least a facial image of a human object in response to a start signal inputted by said human subject, said self-photography apparatus comprising:

an imaging device for picking up an image signal representing said facial image of said human object;

a display device connected to said imaging device for displaying a video facial image of said human object;

detecting means comprising indices provided on said display device for detecting the size of face of said human object, so as to record said facial image in a standardized size on said photograph by making use of said indices, said indices comprising a reference line for indicating standardized positions of the chin and said video facial image, and three scale lines for discriminating the face size between three grades by comparing the position of the crown of the head of said video facial image with said three scale lines.

18. A self-photography apparatus for making a photograph having at least a facial image of a human object in response to a start signal inputted by said human subject, said self-photography apparatus comprising:

an imaging device for picking up an image signal representing said facial image of said human object;

a detection device connected to said imaging device for detecting the size of a face of said human object, said detection device comprises a display for displaying a video facial image of said human object thereon based on said image signal from said imaging device, and indices provided on said display so as to indicate several grades of the face size;

an adjusting device for adjusting a magnification of an image in accordance with the face size detected by said detection device, so as to cause said facial image to have a predetermined size in said photograph, said adjusting device comprises a selection device operated to select a grade of the face size, with reference to said video facial image and said indices, and a drive mechanism for driving said adjusting device in accordance with said selected face size grade wherein said adjusting device further comprises a chair movable in an optical axis direction of said taking lens device, said chair being moved by said drive mechanism within a depth of focus of said taking lens device;

a recording device for recording said facial image onto a recording medium at said magnification, said recording device comprises a taking lens device for focusing the light entering through said exposure window onto said recording medium, a shutter disposed between said taking lens device and said recording medium and activated in response to said start signal, and a camera housing containing said taking lens device and said shutter; and a processing device for processing said recording medium having said facial image recorded thereon so as to produce said photograph.

19. A self-photography apparatus for making a photograph having at least a facial image of a human object in response to a start signal inputted by said human subject, said self-photography apparatus comprising:

an imaging device for picking up an image signal representing said facial image of said human object;

a detection device connected to said imaging device for detecting the size of a face of said human object, said detection device comprises a display for displaying a video facial image of said human of object thereon based on said image signal from said imaging device, and indices provided on said display so as to indicate several grades of the face size;

an adjusting device for adjusting a magnification of an image in accordance with the face size detected by said detection device, so as to cause said facial image to have a predetermined size in said photograph, said adjusting device further comprises a headrest movable in an optical axis direction of said taking lens device, said headrest being moved by said drive mechanism within a depth of focus of said taking lens device;

a recording device for recording said facial image onto a recording medium at said magnification, said recording device comprises a taking lens device for focusing the light entering through said exposure window onto said recording medium, a shutter disposed between said taking lens device and said recording medium and activated in response to said start signal, and a camera housing containing said taking lens device and said shutter; and a processing device for processing said recording medium having said facial image recorded thereon so as to produce said photograph.

20. A self-photography apparatus for making a photograph having at least a facial image of a human object in response to a start signal inputted by said human subject, said self-photography apparatus comprising:

an imaging device for picking up an image signal representing said facial image of said human object;

a detection device connected to said imaging device for detecting the size of a face of said human object, said detection device comprises operation means for deriving a contour of said facial image from said image signal and comparing said contour with a reference contour stored in a memory so as to determine the face size;

an adjusting device for adjusting a magnification of an image in accordance with the face size detected by said detection device, so as to cause said facial image to have a predetermined size in said photograph;

a recording device for recording said facial image onto a recording medium at said magnification; and a processing device for processing said recording medium having said facial image recorded thereon so as to produce said photograph.

21. A self-photography apparatus as recited in claim 20, wherein said adjusting device comprises conversion means connected to said operation means, for processing said image signal so as to electrically convert the magnification of image in accordance with said determined face size.

22. A self-photography apparatus as recited in claim 21, further comprising a designation device for designating more than one of differently standardized dimensions of said photograph, wherein said conversion means converts the magnification of image in accordance with said determined face size so as to record a plurality of said facial images having said differently standardized dimensions designated by said designation device.

23. A self-photography apparatus as recited in claim 21, wherein said recording device comprises a video printer connected to said conversion means for recording said facial image based on said image signal after it has been processed in said conversion means.

24. A self-photography apparatus as recited in claim 22, wherein said recording device comprises a video printer connected to said conversion means for recording said facial image based on said image signal after it has been processed in said conversion means.

25. A self-photography apparatus as recited in claim 23, wherein said video printer comprises a display device for displaying a video image of said human object on the basis of said image signal having, after it has been processed in said conversion means, a printing lens for focusing said video image onto said recording medium, and a shutter disposed between said printing lens and said recording medium.

26. A self-photography apparatus as recited in wherein said video printer comprises a display device for displaying a video image of said human object on the basis of said image signal having, after it has been processed in said conversion means, a printing lens for focusing said video image onto said recording medium, and a shutter disposed between said printing lens and said recording medium.

27. A self-photography apparatus as recited in claim 23, wherein said image signal represents a full-color image, and said video printer comprises three types of light sources for radiating three beams of different wavelength ranges, means for modulating the intensities of said three beams in accordance with red, green, and blue image data of said image signal, means for combining said modulated three beams into a single beam, and beam scanning means for scanning said combined single beam in a first direction of said recording medium being transported in a second direction orthogonal to said first direction at a constant speed, and recording said facial image one line after another on said recording medium.

28. A self-photography apparatus for making a photograph having at least a facial image of a human object in response to start signal inputted by said human subject, said self-photography apparatus comprising:

an imagining device for picking up an image signal representing said facial image of said human object;

a detection device connected to said imaging device for detecting the size of a face of said human object, said detection device comprising means for determining the position of a chin of the facial image and means for determining the position of a crown of a head of the facial image, said means for determining the position of a chin and said means for determining the position of a crown device comprises a display for displaying a video facial image of said human object thereon based on said image signal from said imagining device, and indices provided on said display so as to indicate several grades of the face size, said indices comprise a horizontal reference line designating a position of a chin of said video facial image, and a plurality of scale lines extending parallel to said horizontal reference line at various distances therefrom for comparing the position of the crown of the head of said video facial image therewith;

an adjusting device for adjusting a magnification of an image in accordance with the face size detected by said detection device, so as to cause said facial image to have a predetermined size in said photograph;

a recording device for recording said facial image onto a recording medium at said magnification; and a processing device for processing said recording medium having said facial image recorded thereon so as to produce said photograph.

29. A self-photography apparatus as recited in claim 28, wherein said indices are displayed on said display device in composition with said video facial image.

30. A self-photography apparatus as recited in claim 29, wherein said indices are fixedly disposed on said display device.

* * * * *